United States Patent [19]

MacDiarmid et al.

[11] Patent Number: 5,023,149
[45] Date of Patent: Jun. 11, 1991

[54] ELECTROCHEMISTRY EMPLOYING POLYANILINE

[75] Inventors: Alan G. MacDiarmid, Drexel Hill; Nanayakkara L. D. Somasiri, Philadelphia, both of Pa.

[73] Assignee: University Patents, Inc., Westport, Conn.

[21] Appl. No.: 202,170

[22] Filed: Jun. 3, 1988

Related U.S. Application Data

[60] Division of Ser. No. 906,994, Sep. 12, 1986, Pat. No. 4,820,595, which is a continuation of Ser. No. 620,446, Jul. 14, 1984, abandoned.

[51] Int. Cl.$^5$ .................. H01M 4/00; H01M 4/60
[52] U.S. Cl. ...................... 429/27; 429/43; 429/213
[58] Field of Search .............. 429/212, 213, 43, 27

[56] References Cited

FOREIGN PATENT DOCUMENTS

| 3443455 | 5/1986 | Fed. Rep. of Germany . |
| 2553581 | 4/1985 | France . |
| 60-221964 | 11/1985 | Japan . |
| 60-221973 | 11/1985 | Japan . |
| 60-249265 | 12/1985 | Japan . |
| 61-68864 | 4/1986 | Japan . |
| 61-161673 | 7/1986 | Japan . |
| 1216549 | 12/1970 | United Kingdom ............... 429/213 |

OTHER PUBLICATIONS

Kitani et al, "Studies on Organic Polymers Synthesized by Electrolytic Method, Secondary Battery Using Polyaniline", (Abstract of Presentation to 50th Meeting of the Electrochemical Society of Japan), 3/29/83.
Chemical Abstract, v. 87 No. 97537n, Buvet et al, 1977.

*Primary Examiner*—Stephen J. Kalafut
*Attorney, Agent, or Firm*—Woodcock, Washburn, Kurtz, Mackiewicz & Norris

[57] ABSTRACT

Electrochemical cells including secondary batteries and fuel cells are provided employing polyanilines having improved reversibility, stability and electrochemical properties. In accordance with a preferred embodiment polyaniline is employed as a cathode active polymer in a secondary battery at a pH between about 1 and 11. In accordance with nother embodiments, fuel cells employing polyaniline are provided as are batteries wherein polyanilines are used as anodes.

36 Claims, 5 Drawing Sheets

FREE AMINE FORM        AMMONIUM SALT FORM

1A
INSULATING

1S
INSULATING

OXIDIZE ↕ REDUCE       OXIDIZE ↕ REDUCE

2A
INSULATING

2S
METALLIC

OXIDIZE ↕ REDUCE       OXIDIZE ↕ REDUCE

3A
METALLIC

3S
METALLIC

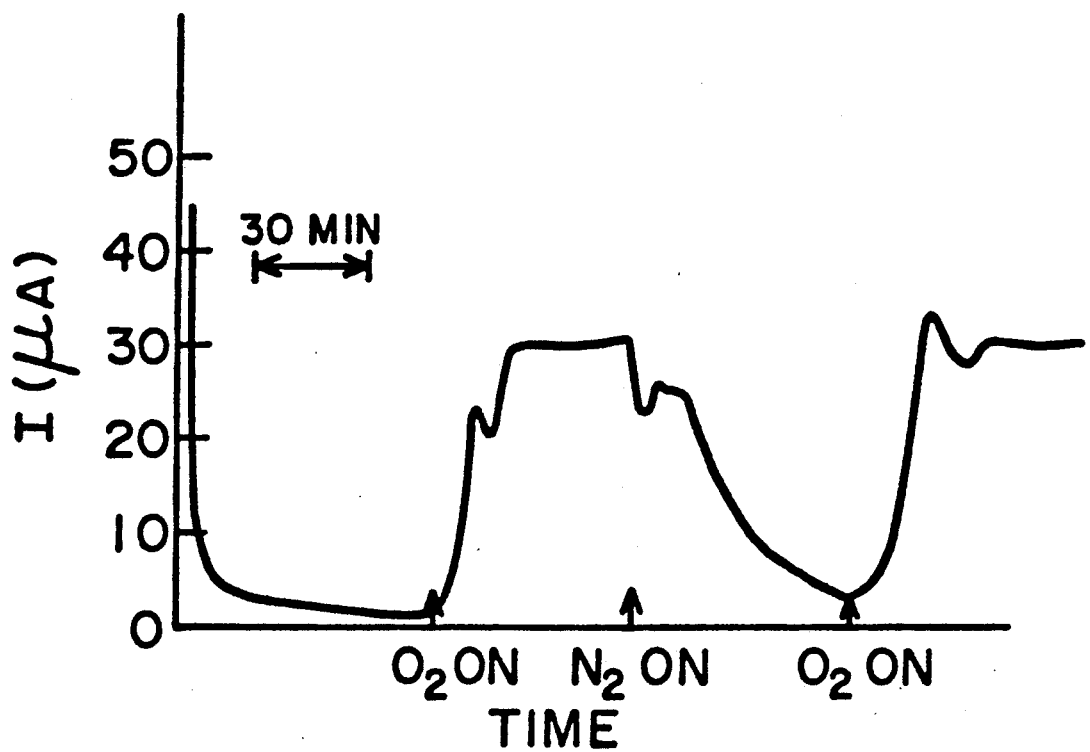

ELECTROCHEMISTRY EMPLOYING POLYANILINE

Certain aspects of the present invention were supported by the National Science Foundation—Grants DMR-82-16718 and DMR-80-22870. Certain rights have been retained by the United States Government in respect to this invention.

This application is a division of Ser. No. 906,994, filed Sept. 12, 1986 and now U.S. Pat. No. 4,820,595 which is a continuation of U.S. Ser. No. 620,446, filed July 14, 1984, now abandoned.

FIELD OF THE INVENTION

This invention is directed to the electrochemistry of a class of polymeric materials known as polyanilines, to materials produced in accordance with the methods, and to highly effective secondary batteries produced therefrom. More particularly, this invention is directed to the surprising discovery that the careful control of certain chemical parameters, especially pHs, permits the electrochemistry of polyaniline and related compounds to proceed in a highly reversible fashion to yield secondary batteries having improved reversibility, stability, energy density, coulombic efficiency, and other beneficial factors.

This invention is also directed to other electrochemical devices, such as fuel cells, electrolytic cells and the like which may beneficially employ the improvements in electrochemistry which have now been discovered as they pertain to the class of polyanilines.

BACKGROUND OF THE INVENTION

There has recently been an increased interest in electrochemistry and electrochemical phenomena of polymeric systems. See, in this regard, U.S. Pat. Nos. 4,222,903 and 4,204,216—Heeger et al. and U.S. Pat. Nos. 4,321,114 and 4,442,187—MacDiarmid et al. which are directed to the electrochemistry of certain conjugated polymers having extended conjugation in at least one backbone chain thereof. Each of the foregoing are incorporated herein by reference.

While interest has also been directed at certain non-conjugated polymers, including certain forms of the polyanilines, work in that area has not met with successful development of secondary batteries, fuel cells, or substantially reversible electrochemical methods. Jozefowicz et al., has undertaken certain electrochemical studies of certain forms of polyaniline as an anode and cathode in aqueous solution. See, for example French Patent No. 1,519,729; French Patent of Addition No. 94,536; U.K. Patent No. 1,216,549; "Direct Current Conductivity of Polyaniline Sulfates", M. Doriomedoff, F. Hautiere-Cristofini, R. DeSurville, M. Jozefowicz, L-T. Yu, and R. Buvet, J. Chim. Phys, Physicochim. Biol. 68, 1055 (1971); "Continuous Current Conductivity of Macromolecular Materials", L-T. Yu, M. Jozefowicz, and R. Buvet, Chim. Macromol. 1, 469 (1970); "Polyaniline-Based Filmogenic Organic-Conductor Polymers", D. LaBarre and M. Jozefowicz, C. R. Acad. Sci., Ser. C, 269, 964 (1969); "Recently Discovered Properties of Semiconducting Polymers", M. Jozefowicz, L-T. Yu, J. Perichon, and R. Buvet, J. Polym. Sci., Part C, 22, 1187 (1967); "Electrochemical Properties of Polyaniline Sulfates", F. Cristofini, R. DeSurville, and M. Jozefowicz, C. R. Acad. Sci., Ser. C, 268, 1346 (1969); "Electrochemical Cells Using Protolytic Organic Semiconductors", R. DeSurville, M. Jozefowicz, L-T. Yu, J. Perichon, and R. Buvet, Electrochim. Acta, 13, 1451 (1968); "Oligomers and Polymers Produced by Oxidation of Aromatic Amines", R. DeSurville, M. Jozefowicz, and R. Buvet, Ann. Chim. (Paris), 2, 5 (1967); "Experimental Study of the Direct Current Conductivity of Macromolecular Compounds", L-T. Yu, M. Borredon, M. Jozefowicz, G. Belorgey, and R. Buvet, J. Polym. Sci., Polym. Symp., 16, 2931 (1967); "Conductivity and Chemical Properties of Oligomeric Polyanilines", M. Jozefowicz, L-T. Yu, G. Belorgey, and R. Buvet, J. Polym. Sci., Polym. Symp., 16, 2934 (1967); "Products of the Catalytic Oxidation of Aromatic Amines", R. DeSurville, M. Jozefowicz, and R. Buvet, Ann. Chim. (Paris), 2, 149 (1967); "Conductivity and Chemical Composition of Macromolecular Semiconductors", L-T. Yu and M. Jozefowicz, Rev. Gen. Electr., 75, 1014 (1966); "Relation Between the Chemical and Electrochemical Properties of Macromolecular Semiconductors", M. Jozefowicz and L-T. Yu, Rev. Gen. Electr., 75, 1008 (1966); "Preparation, Chemical Properties, and Electrical Conductivity of Poly-N-Alkylanilines in the Solid State", D. Muller and M. Jozefowicz, Bull. Soc. Chim. Fr., 4087 (1972). Jozefowicz et al. employed a reduced form and an oxidized form of polyaniline, neither of which was analyzed or characterized in any way as to their chemical composition, as the anode and cathode respectively in one normal sulphuric acid (pH=0). They observed that such an electrochemical cell could be charged and discharged for two consecutive cycles.

Repetition of the disclosures of Jozefowicz by the inventors of this invention (see the Examples hereto) has shown that the methods of Jozefowicz do not lead to substantial reversibility of electrochemistry involving polyaniline or to electrochemical cells having sufficient reversibility as to provide practical utility for secondary battery use.

An attempt at the preparation of secondary batteries from polyaniline was reported by Kitani et al. at the 24th Annual Battery Conference in Osaka, Japan on Nov. 9–14, 1983, entitled "Secondary Batteries Using Polyaniline". These anhydrous systems are dissimilar from the instant invention.

OBJECTS OF THE INVENTION

It is a principal object of the invention to provide improved methods for performing electrochemistry with aniline polymers.

It is another object of this invention to provide secondary batteries which are reversible to a substantial extent and which are commercially and practically useful.

Yet another object is to provide electrochemical cells including secondary batteries which may be charged and discharged for many pluralities of cycles, preferably in excess of 100 cycles.

A further object is to provide fuel cells and other electrochemical devices employing the improvements of the instant invention.

A further object is to provide secondary batteries which may be formulated at reduced cost when compared to presently available secondary batteries.

Secondary batteries having excellent coulombic efficiency, improved shelf life, and excellent recyclability are also objects of the instant invention.

A further object is to provide new forms of aniline polymers useful in electrochemistry.

Yet another object is to provide fuel cells and the like which are able to operate at increased efficiencies.

Still further objects will become apparent from a review of the instant specification.

BRIEF DESCRIPTION OF THE DRAWINGS

FIGS. 7 and 8 demonstrate certain fuell cell effects of polyaniline.

SUMMARY OF THE INVENTION

It has now been discovered that through careful modification and maintenance of the chemical environment, especially pH, of polyanilines, that such may be employed as electrodes in electrochemical cells such as secondary batteries having substantial reversibility over many pluralities of cycles. Other electrochemical devices, such as fuel cells and the like, may also be constructed employing the foregoing discoveries.

Jozefowicz's electrochemical studies on polyaniline were carried out in one normal acid, such as sulphuric acid solution. Under those conditions, it has been found that polyaniline degrades and that secondary batteries which are attempted using polyaniline under those conditions are substantially irreversible and become unusable after an impracticably small number of cycles. Unlike the systems employed by Jozefowicz which employ electrolyte pHs of about 0 (one normal acid), the systems of the instant invention employ carefully controlled pHs greater than zero, preferably between about 1 and 11, more preferably between about 2 and 10 and still more preferably, between about 2 and 6. Under these carefully controlled conditions, it has, surprisingly, been discovered that the electrochemistry of polyaniline is highly reversible. The foregoing electrochemistry, in direct distinction with Jozefowicz, has been repeatedly reversed, and, most significantly, may be repeated while retaining high coulombic efficiency, retention of capacity, and stability. Moreover, at best, Jozefowicz's cells employing forms of polyaniline for both cathode and anode can be only one-half as efficient as those of the instant invention since upon complete discharge of the cell each electrode is in an intermediate state between a fully oxidized and a fully reduced state on polyaniline. A further significant aspect of the instant invention is that under the carefully controlled conditions of pH in accordance with the invention, secondary batteries comprising anode means, cathode means and electrolyte, wherein one or possibly both of the electrodes comprises an aniline polymer can be prepared such that the batteries are capable of being recycled many pluralities of times while retaining excellent recyclability, capacity, coulomb recovery, and shelf life.

In accordance with other embodiments, polyaniline may be employed as an electrode in electrochemical cells under controlled conditions and may be employed in fuel cells as an electrode active material.

Figure 1:
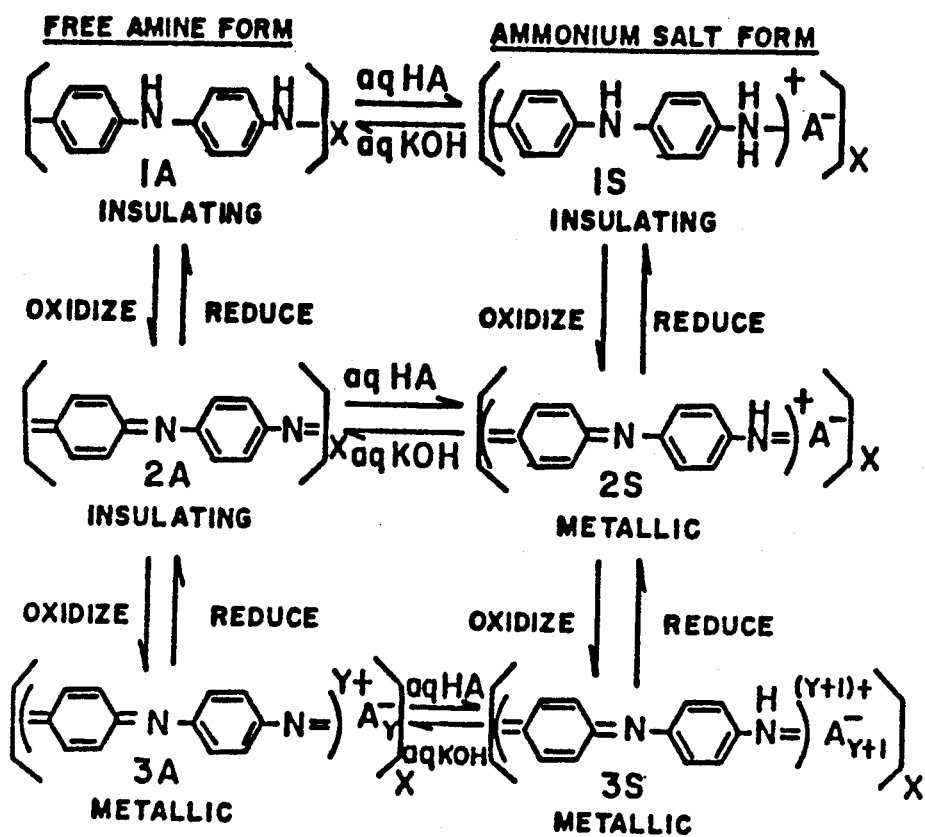
FIG. 1 represents a proposed scheme of interconversion among certain forms of aniline polymers.

While applicants do not wish to be bound by any particular theory in explaining the surprising benefits to be achieved through the practice of the instant invention, and while the proposed explanation is not to be construed as a limitation of the scope of the invention, which is limited solely by the appended claims, applicants believe that polyaniline may be interconverted among six forms through oxidation, reduction, protonation and de-protonation. The six forms, which may thus be envisioned, form three oxidation states, each of which has free amine or imine forms and their respective salt forms. For convenience, these six proposed forms are illustrated in FIG. 1 where HA represents an acid and KOH represents a base. As is suggested in FIG. 1, two of the free amine/imine forms and one of the salt forms are believed to exhibit generally insulating or semiconducting properties while imine form 3A and salt forms 2S and 3S are believed to exhibit metallic behavior. It is also believed that each of the six forms may be interconverted to the others, as depicted, through oxidation and reduction and through proton transfer at an appropriate pH. Of course, in a given sample, mixtures of the forms may occur.

While those of ordinary skill in the art are again cautioned that the instant invention is not to be measured by theory, but rather only by the appended claims, it is presently believed that the benzenoid-quinoid diiminium salt 2S has been synthesized and chemically analyzed. This material may be synthesized as a dark blue powder by treatment of an aqueous hydrochloric acid solution of aniline with ammonium persulfate $(NH_4)_2S_2O_8$. After washing with one normal hydrochloric acid and drying in vacuo for about two days, the material exhibits a constant conductivity in the metallic regime of approximately 5 $ohms^{-1}cm^{-1}$. It may also be synthesized as a clear, dark green, cohesive film through electrochemical oxidation of aniline in aqueous fluoroboric acid electrolyte on a platinum foil anode. Treatment of form 2S with base such as aqueous or methanolic alkali solution removes hydrochloric acid and converts the polymer to the free benzenoid-quinoid di-amine form 2A. This material has a conductivity of about $10^{-11}$ $ohm^{-1}cm^{-1}$. Forms 2A and 2S may be interconverted at will by the use of pHs between about 1 and 4. The semiconductor-metal transition which 2A undergoes when it is converted to 2S by aqueous acid represents a completely new type of doping phenomenon in a conducting polymer. Previous doping procedures, such as those described by Jozefowicz, have always involved oxidation or reduction of the polymer.

The present type of doping appears to involve a simple acid-base interaction and to be, accordingly, pH dependent. The 2S salt can have the positive charge on the nitrogen atom delocalized, in part, onto the carbon atoms of the adjacent benzene rings. This may likely be responsible for its high conductivity. A continuous change in both conductivity and chemical composition between forms 2S and 2A is believed to be achievable simply by washing form 2A with aqueous hydrochloric acid solution of different concentrations. The more dilute the acid solution (the higher the pH) the smaller is the extent of protonation of form 2A and the smaller is its conductivity. For example, a change in conductivity of approximately $10^9$ occurs when the pH of the aqueous HCl used in washing is changed from about 3 to about 1.5. The extent of "doping" (estimated in such a case by the Cl/N ratio times 100 in the polymer) after washing under the above conditions, is approximately 0.4% and approximately 16% respectively.

Since acid or base strength was of no concern to Jozefowicz's oxidative doping procedures, it is not surprising that Jozefowicz did not appreciate the importance of pH control or of the proper maintenance of the chemical environment of the aniline polymer which has now been found to be critical to the employment of the present invention.

It is believed that polyanilines having forms 1A and 2A have not been prepared and characterized heretofore. While substituted polyanilines of forms 1A and 2A have not yet been prepared, their properties are believed likely to be useful in the practice of one or more embodiments of the invention. Moreover, it is believed that forms 3A and 3S are also novel.

Both forms 2A and 2S can be electrochemically reduced, reversibly, in aqueous solution, to the pale yellow forms 1A and 1S respectively. The relationship between those four idealized forms together with forms 3A and 3S are believed to be as suggested in FIG. 1. Further oxidation of forms 2A and 2S to forms 3A and 3S is believed to be possible.

It is presently believed that polyanilines of form 2A may be the most significant in their suitability for use in secondary battery construction, and in other electrochemical uses including fuel cells. It is believed that due to its low base strength, polyaniline form 2S dissociates to polyaniline form 2A in the presence of aqueous solutions having pHs from about 2 to 6. In electrolytes having a pH between about 2 and 6, the electrochemical charge and discharge reactions are believed to cycle between forms 1A and 2A. In electrolytes having a pH substantially less than 2, and even more clearly, below about 1 (i.e. at higher acid concentrations) discharge and charge reactions are believed to cycle between forms 1S and 2S.

Other chemical and electrochemical syntheses and transformations of the forms of polyaniline may likely be discovered and are presently contemplated as being useful. Moreover, additional forms or types of polyaniline may be elucidated in the future. Accordingly, no limitation to the syntheses, transformations or structures herein described or postulated is intended beyond the limitations of the appended claims.

It has been found that a rechargeable (secondary) battery cell can be constructed using polyaniline form 2A as the cathode and certain metallic or other species, such as zinc or amalgamated zinc, as the anode in an aqueous electrolyte such as the combination of 1 molar zinc chloride, ¼ molar ammonium chloride, and 1/10 molar sodium fluoroborate. This electrolyte has a pH of from about 4 to about 5. The cell thus constructed with zinc exhibits an open circuit voltage of about 1.4 volts and a short circuit current of about 150 mA/cm². The cell demonstrates a coulombic efficiency of about 95%.

The foregoing cell has a semi-theoretical energy density of approximately 186 watt hours/Kg based on the experimentally determined average discharge voltage of 1.1 volts and the discharge reaction given in the following reaction scheme:

An appropriate operating pH and, hence, the release or consumption of appropriate amounts of HCl required in the discharge and charge processes as given by the above equation, may conveniently be adjusted by the use of selected buffer solutions. A cell consisting of 3.1 mg of polyaniline form 2S, electrochemically deposited as a film on a 3.2 cm² platinum electrode, was used as a cathode in conjunction with an amalgamated zinc anode in the electrolyte described above. At the operating pH of the cell, form 2S spontaneously converted to form 2A by loss of HCl. It was deep discharged and charged between 0.8 volts and 1.40 volts (versus the zinc anode) at a constant current density of 0.05 Ma/cm². The coulombic efficiency for each cycle during 46 cycles fell in the range of 92–99%. The capacity at the end of 46 cycles was 96% of that of the first cycle. The discharge and charge current densities were then changed to 0.1 Ma/cm² for the next 155 cycles to give a total of 201 cycles. The coulomb efficiency for each cycle remained within the range 93–96% and the capacity after the 201st cycle was 92% of that of the 47the cycle. During cycling, the polyaniline was believed to cycle between the 1A and 2A forms including mixtures thereof. The experimental energy density based only on the weights of polymer form 2A and the weight of hydrochloric acid and zinc consumed in the discharge process was 102 watt hours/Kg at an average experimental discharge voltage of 1.02 volts. After one month standing in the charged state, 98% coulomb recovery was obtained.

Figure 4:
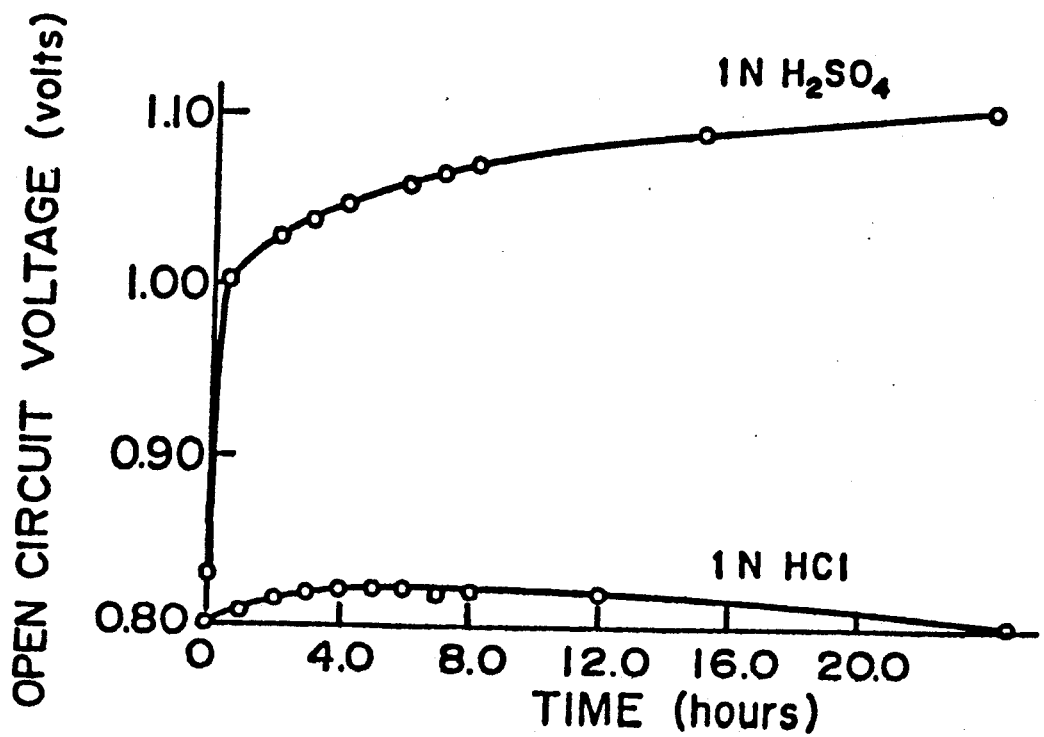
FIG. 4 demonstrates the degradative effect of strong aqueous solutions of $H_2SO_4$ on polyaniline.

When the identical experiment was conducted under the pH conditions of Jozefowicz, cited previously, the results were totally inconsistent with reversibility in electrochemical doping and led to a conclusion that the procedures of Jozefowicz could not be conformed for construction of a secondary battery having any substantial reversibility, commercial significance or practical use. Thus, when the foregoing experiment was duplicated employing one normal sulphuric acid at a concomitant pH of less than 0, it was observed that the zinc anode slowly dissolved, even when lightly amalgamated with mercury, with the liberation of hydrogen gas. Any attempt at the preparation of a battery using the conditions of pH taught by Jozefowicz would lead to a device having negligible shelf life. Additionally, the coulombic efficiency and the capacity of the cell decreased upon cycling. This is believed to be due to destructive oxidation of the polyaniline by the acid. Rapid consumption of the zinc anode is the inevitable result. Further confirmation of the oxidation of the polyaniline by the one normal sulfuric acid may be had from the fact that the cell in its discharged state exhibits an increase in its voltage versus zinc from approximately 0.83 volts up to about 1.1 volts. See FIG. 4.

While the sulphuric acid concentration taught by Jozefowicz is utterly inconsistent with reversibility in polyaniline electrochemical systems, other acids at similar pHs are no better. Thus, preparation of similar electrochemical cells employing polyaniline at Jozefowicz's pH of 0 employing hydrochloric acid leads to similar increases in the potential of a polyaniline/zinc cell due, possibly, to oxidation from atmospheric oxygen. While this effect might possibly be diminished through use of inert atmospheres, the observation supports a conclusion of the lack of pertinency of Jozefowicz since all of his cells were open to the atmosphere.

Accordingly, it is believed that the neutral type polyaniline molecules which predominate at pHs greater than about 2 as in accordance with the instant invention, i.e., the amine/imine type materials, are more stable to degradation than are the salt forms extant at lower pHs. Recyclability is thus possible to a practical extent at the higher pH.

While the cathodic properties of polyaniline have been most extensively evaluated to date, polyaniline may also serve as an anode in electrochemical cells. Thus, polyaniline 1S may be placed (or formed) in electrolytes of relatively low pH. Suitable cathodes such as lead dioxide, manganese dioxide, other metal oxides, $O_2$, $H_2O_2$ and certain doped polymers including doped polyacetylene and polyparaphenylene, etc. are preferably employed. For anode applications, it is believed that pHs greater than about 0 and preferably above about 1 will still be required to avoid polymer degradation, although lower pHs may be employed for certain applications.

It may also be possible to formulate electrochemical cells and/or secondary batteries employing polyaniline as both anode and cathode. In such a case, it may be possible to employ the polyaniline as portions of a unitary mass for this purpose, preferably impregnating the same with a suitable electrolyte.

Fuel cells may also be constructed employing certain embodiments of this invention. Thus, polyaniline in an electrochemical cell is contacted by an oxidizing agent and a reducing agent or fuel to effect a catalyzed redox reaction with concomitant production of current. Suitable oxidizing agents include oxygen, hydrogen peroxide, halogens, and many others. Suitable fuels include metals, hydrazene, sodium dithionite, and many others. The polyaniline may serve either as anode or, preferably, cathode or both when contacted with the reactants to catalyze the reaction.

All of those uses for electrochemical cells known to those skilled in the art which may benefit from employment of the instant invention are contemplated herein. Thus, in addition to battery, fuel cell and related uses, employment in sensors, actuators, control devices, electrolytic cells and other uses is contemplated as well, including each of those uses described in the patents incorporated herein by reference.

The aniline polymers which are capable of being employed in the practice of one or more embodiments of the instant invention are any of those aniline polymers which are derived from aniline itself, or from substituted anilines, with the proviso that the anilines thus employed may not be N-substituted. Accordingly, anilines having one or more alkyl, aryl, aralkyl and alkaryl substituents may be useful in the practice of this invention. Moreover, fused ring systems such as the naphthalene amines are also comprehended by the present definition.

It is also likely that one or more heteroatomic substitutions such as amino or halo, and possibly hydroxyl, alkoxide, thio, etc., may also find utility in certain embodiments. Organometallic substituents such as an iron tetracarbonyl moiety, biphenyl chromium moiety, and many others may have particular use especially in the use of polyaniline as fuel cell electrodes. Of particular interest are the polyamino benzenes such as the diamino benzenes which may exhibit particular utility herein. In all of the foregoing cases, the suitable anilines are best described by what they do. Thus, suitable anilines are those which are polymerizable and which are dopable by ionic species to effect modified electrical conductivities, which doping is highly reversible at some condition of pH greater than about 1.

The preferred material for use in accordance with the present invention is polyaniline itself. The polyaniline polymers which may be employed in this invention may be prepared by any of those means which are known to those of ordinary skill in the art for such preparation. Thus, certain of the methods of Jozefowicz, referred to above, may be employed although the foregoing methods are generally crude. Preferably, polyaniline polymers are prepared in accordance with the instant examples.

When a polyaniline is employed as a cathode active material suitable anodes include polyaniline itself, separately or in a unitary mass, together with many other materials. Such anode materials must be stable in the cell environment, must be ionizable within the context of the electrochemical reaction and must have a reduction potential more negative than the cathode, for polyaniline, generally less than $+0.64$ volts. Such materials may be found, inter alia, from review of the *Handbook of Chemistry and Physics*, CRC Co., 52nd ed. at p. D-111 et seq. Exemplary materials include Cd, Pb, Zn, Mn, Ni, Sm, Ti, Mg and materials such as hydrazine.

When the polyaniline is used as an anode, polymers may serve as cathode including p-doped polyacetylene and polyparaphenylene, organics such as benzoquinone, $O_2$, $H_2O_2$ and metal oxides having, generally, positive reduction potentials (greater than the polyaniline anode). Of course the materials must be stable but ionizable within the context of the cell. Such metal oxides include $MnO_2$, $PbO_2$, $Ni_2O_3$ and others.

A wide variety of electrolytes may be employed which have effective stability, mobility and activity in the electrochemical cells of the invention. Selection of suitable electrolytes including solvent and solvent components is within the skill of the Routineer who will be able to select such materials to be compatible with the electrodes, the cell environment and the requisite pH. Selection of buffers and pH modification agents suitable for use in the electrolytic cells of the invention are similarly within the skill of those skilled in the art, in view of the herein-described considerations.

In some cells, especially those employing the A forms of aniline polymers, conductivity enhancing materials such as carbon black, other polymers and the like may be employed. When elaborated as a film on a current collector, most polyanilines do not require such enhancement.

The following examples are intended as exemplary only and are not to be construed as limiting.

EXAMPLE 1

Electrochemical Synthesis of Polyaniline ($BF_4^-$ Anion) (2S)

The electrochemical polymerization of aniline was carried out in an aqueous solution of 5 ml of 48% fluoboric acid, 1 ml of aniline purified in accordance with Mohilner et. al, J. Am. Chem. Soc., 84, 3618 (1962), and 10 ml of distilled water. The electrodeposition was carried out on a Pt foil (1 cm$^2$) with another Pt electrode at 1 cm distance, by applying 0.05 V successive increments in potential until 0.75 V was reached so that the current that flowed through the system never exceeded 1 mA. A Princeton Applied Research potentiostat (Model 363) was used for this purpose and the polymerization took about 30 minutes. The potential was then held constant at 0.75 V overnight (20 hours). The solution was stirred throughout. The film was washed thoroughly in a mixture of 5 ml of 48% fluoboric acid in 10 ml of distilled water. The weight of the film (polyaniline 2S) after drying under vacuum was 3.2 mg.

EXAMPLE 2

Alternate Electrochemical Synthesis of Polyaniline ($BF_4^-$ Anion) (2S)

Electrochemical polymerization of aniline was carried out in a 10 ml aqueous solution consisting of 1.0M purified aniline and 1.0M fluoboric acid. The electrodeposition of polyaniline, form 2S, on platinum was carried out potentiostatically at 0.90 V using another platinum electrode as a counter electrode. The two platinum electrodes were 1 cm apart. The solution was stirred continuously. A thin, dark green film was deposited on the anode within half an hour. The film was washed in 1M fluoboric acid and dried under dynamic vacuum for 24 hours.

EXAMPLE 3

Preparation of Free Standing Film of Polyaniline ($ClO_4^-$ Anion) (2S)

The working electrode consisted of a conducting glass (Indium oxide coating) electrode connected to a power source with an aligator clip. The contact was secured by coating it with a layer of Electrodag ™ cement. The counter electrode was a piece of Pt foil (area about 6 $cm^2$). The electrolyte solution consisted of 20 ml $H_2O$, 4 ml $HClO_4$ (70%) and 2 ml purified aniline monomer. For the polymerization, the galvanostatic method (constant current of 50 $\mu A/cm^2$) usually gives more homogeneous film, whereas the potentiostatic method (constant polymerization potential of 0.75 V between two electrodes) gives less homogeneous film. However, thicker films are more easily obtained using the potentiostatic method. The film, prepared by the potentiostatic method, was washed with 1M HCl, then peeled off by contacting the surface with a sheet of paper. The film can be dried in air or in vacuo.

As grown, the free standing film has a density of about 0.11 $g/cm^3$ to 0.14 $g/cm^3$. The thickness varied from approximately 10 $\mu m$ to 200 $\mu m$, depending on the duration of polymerization. The conductivity of these films were about 2 $ohm^{-1}cm^{-1}$.

EXAMPLE 4

Electrochemical Synthesis of Polyaniline (2A)

A 3.2 mg polyaniline (2S) film, prepared in accordance with Example 1 was converted to polyaniline form 2A by immersing it in a mixture of 10 ml of 0.5M KOH and 20 ml of methanol for 3 hours. The film was subsequently washed in a 1:2 volume ratio of water and methanol and vacuum dried for 6 hours. The weight of the film was found to be 2.0 mg.

EXAMPLE 5

Chemical Synthesis of Polyaniline ($Cl^-$ Anion) (2S) Powder

Twenty ml of purified aniline, distilled under reduced pressure of a water aspirator from a vessel containing granulated Zn or Zn powder plus glass wool, was dissolved in 500 ml of 1M HCl (aqueous) at room temperature (22° C.). 11.5 grams powdered solid $(NH_4)_2S_2O_8$ were added to the solution while being stirred. It dissolved within 0.5 min. A blue color started to appear after 2 minutes and a dark blue powder then precipitated. After 5 minutes the temperature of the reaction mixture rose to 25° C. and the reaction vessel was cooled in an ice bath to 22° C., at which temperature the reaction was carried out for 1 hr. The reaction mixture was then filtered on a Buchner Funnel. The residue was washed on the funnel by isolating the filter flask from the aspirator, triturating the residue with 250 ml 1M HCl with a glass rod for 10 minutes, and applying suction. The washing procedure was repeated 4 times. The residue was then air-dried overnight on the filter paper under a water aspirator vacuum. The powder was then ground and placed into a wide-bottomed container which was subsequently evacuated and kept under dynamic vacuum of 10 microns for approximately one week. Portions of the powder were removed from time to time and were compressed into a pellet. The conductivity of each pellet was measured with a Van der Pauw, 4-probe apparatus. The conductivity of polyaniline, prepared by the method described above, decreases in vacuo from greater than about 10 $ohm^{-1}cm^{-1}$ to a constant value of about 3 $ohm^{-1}cm^{-1}$ after approximately 3 days evacuation and remained constant at this value for ca. four additional days.

EXAMPLE 6

Alternate Method of Chemical Synthesis of Polyaniline ($BF_4^-$ Anion) (2S) Powder Chemical polymerization of aniline into a powder form was carried out by dissolving 20 g of aniline in 500 ml of 1M fluoboric acid. 11.5 grams of powdered solid $(NH_4)_2S_2O_8$ was added to this solution. This dissolved within 1 minute. The reaction temperature was kept at 20°–25° C. by occasionally immersing the reaction vessel in an ice bath. After 2 minutes stirring, the reaction mixture turned green and after an additional 2 minutes, turned dark blue. After 60 minutes stirring a dark blue precipitate formed and was filtered on a Buchner Funnel. The product was washed with two 50 ml portions of 1M $HBF_4$ on the filter then with 250 ml distilled water and finally dried under vacuum for 24 hours. Different preparations gave material which had conductivities between 1 and 5 $ohm^{-1}cm^{-1}$. The elemental analysis of this material ($\sigma = 2.2$ $ohm^{-1}cm^{-1}$ after pumping for 24 hrs) is as follows:

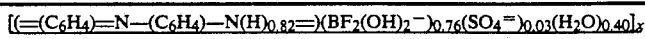

| [(=$C_6H_4$)=N—($C_6H_4$)—N(H)$_{0.82}$=)($BF_2(OH)_2^-$)$_{0.76}$($SO_4^=$)$_{0.03}$($H_2O$)$_{0.40}$]$_x$ | | |
|---|---|---|
| | Calculated (%) | Found (%) |
| C | 56.50 | 56.74 |
| H | 4.38 | 4.34 |
| N | 10.98 | 10.83 |
| B | 3.26 | 3.21 |
| F | 11.44 | 11.43 |
| S | 0.43 | 0.43 |
| O* | 13.02 | 13.02 |

-continued $[(=(C_6H_4)=N-(C_6H_4)-N(H)_{0.82}=)(BF_2(OH)_2^-)_{0.76}(SO_4^=)_{0.03}(H_2O)_{0.40}]_x$

| | Calculated (%) | Found (%) |
|---|---|---|
| | 100.01% | 100.00% |

EXAMPLE 7

Alternate Method of Chemical Synthesis of Polyaniline (Cl− Anion) (2S) Powder This experiment was carried out according to Example 5 except that the reaction vessel was immersed in an ice bath throughout the reaction, thereby maintaining a reaction temperature of 0°-5° C., and stirred for 2 hours. The precipitate thus formed was filtered and then equilibrated with acid by stirring the material with 300 ml of 1M HCl for an additional 2 hours. The product was then filtered on a Buchner funnel and was air-dried on the filter paper under a water aspirator vacuum for ca. 15 hours. The powder was then pulverized and dried under a dynamic vacuum of ca 10 microns for 24 hours. Different preparations gave materials of conductivity between 1 and 5 ohm$^{-1}$cm$^{-1}$. Elemental analysis of the one sample gave the following results:

$[(=(C_6H_4)=N-(C_6H_4)-N(H)_{1.08}=)^{+1.08}Cl_{1.08}^-(H_2O)_{0.35}]_x$

| | Calculated (%) | Found (%) | |
|---|---|---|---|
| C | 64.66 | 63.76 | |
| H | 4.35 | 5.17 | |
| Cl | 15.90 | 15.84 | |
| S | 0 | 0 | |
| N | 12.50 | 12.79 | |
| O | 2.59 | 2.44 | (by difference) |
| Total | 100.00 | 100.00 | |

Analyses of additional samples are given below together with the drying time of the powder (dynamic vacuum) and 4-probe conductivity.

(A) $[(=C_6H_4)=N-(C_6H_4)-N(H)_{0.863}=)^{+0.863}Cl_{0.863}^-(H_2O)_{1.87}]_x$
$\sigma = 5.69$ ohm$^{-1}$ cm$^{-1}$
Drying time = 24 hours

| | Calculated (%) | Found (%) | |
|---|---|---|---|
| C | 58.72 | 58.66 | |
| H | 5.14 | 4.94 | |
| N | 11.42 | 11.50 | |
| Cl | 12.49 | 12.59 | |
| O | 12.22 | 12.31 | (by difference) |
| Total | 100.00 | 100.00 | |

(B) $[(=(C_6H_4)=N-(C_6H_4)-N(H)_{1.03}=)^{+1.03}Cl_{1.03}^-(H_2O)_{0.327}]_x$
$\sigma = 2.51$ ohm$^{-1}$ cm$^{-1}$
Drying time = 24 hours

| | Calculated (%) | Found (%) | |
|---|---|---|---|
| C | 64.45 | 63.59 | |
| H | 4.33 | 4.92 | |
| N | 12.53 | 12.38 | |
| Cl | 16.35 | 16.15 | |
| O | 2.34 | 2.96 | (by difference) |
| | 100.00 | 100.00 | |

The water given in the composition is only tentative. The apparent oxygen content of the samples can be ascribed to the presence of some water; however the fact that a considerable quantity of oxygen is still present even after heating a sample (prepared according to Example 5) in vacuum at 110° C. for 16 hours as shown by the analysis below, suggests that the oxygen is more likely to be present as terminal groups of the polymer.

$[(=(C_6H_4)=N-(C_6H_4)-N(H)_{0.64}=)^{+0.64}(Cl^-)_{0.64}(H_2O)_{0.60}]_x$
$\sigma = 8 \times 10^{-2}$ ohm$^{-1}$ cm$^{-1}$

| | Calculated (%) | Found (%) | |
|---|---|---|---|
| C | 67.22 | 66.02 | |
| H | 4.63 | 4.84 | |
| N | 13.07 | 13.53 | |
| Cl | 10.58 | 10.94 | |
| O | 4.50 | 4.67 | (by difference) |
| S | 0 | 0-traces | |
| | 100.00 | 100.00 | |

EXAMPLE 8

Chemical Synthesis of Polyaniline (2A) Powder

Polyaniline powder (form 2S) synthesized in 1M HCl by the method in Example 7 was converted into polyaniline form 2A by stirring overnight in a mixture of 100 ml of 0.5M KOH and 200 ml of methanol. The material was filtered and then washed by stirring the product in a 1:2 volume mixture of methanol in water for 24 hours. The material was filtered and dried in vacuo for 24 hours. The following analyses were obtained for two separately formulated samples.

(1) $[(=(C_6H_4)=N-(C_6H_4)-N(H)_{0.04})^+(Cl^-)_{0.04}(H_2O)_{0.32}]_x$

| | Calculated (%) | Found (%) | |
|---|---|---|---|
| C | 76.90 | 76.31 | |
| H | 4.66 | 4.99 | |
| N | 14.95 | 15.22 | |
| Cl | 0.76 | 0.85 | |
| O | 2.73 | 2.63 | (by difference) |
| S | 0 | 0-traces | |
| | 100.00 | 100.00 | |

(2) $[(=(C_6H_4)=N-(C_6H_4)N(H)_{7.84 \times 10^{-3}}=)^{+7.84 \times 10^{-3}}Cl_{7.84 \times 10^{-3}}^-(H_2O)_{0.481}]_x$
$\sigma = 2.30 \times 10^{-10}$

| | Calculated (%) | Found (%) | |
|---|---|---|---|
| C | 76.21 | 75.64 | |
| H | 4.75 | 4.96 | |
| N | 14.82 | 15.10 | |
| Cl | 0.15 | 0.15 | |
| O | 4.07 | 4.15 | (by difference) |

-continued

| | |
|---|---|
| 100.00 | 100.00 |

EXAMPLE 9

Proof that Electrochemically and Chemically Prepared Polyaniline (2S) are Chemically Identical and that Electrochemically and Chemically Prepared Polyaniline (2A) are Chemically Identical The infrared spectra of polyaniline ($ClO_4^-$ Anion) (2S) and polyaniline (2A) synthesized electrochemically as described in Example 3 and 4 respectively and also the infrared spectrum of polyaniline ($Cl^-$ Anion) (2S), and polyaniline (2A) synthesized chemically as described in Example 7 and 8, respectively were as follows:

| Electrochemically Prepared ($cm^{-1}$) | Chemically Prepared ($cm^{-1}$) |
|---|---|
| Polyaniline (2S) | |
| ~3400 Very weak[a] | 3450 M (broad) |
| 1560 S | 1560 S |
| 1478 S | 1475 S |
| 1287 S | 1300 S |
| 1236 Very weak | 1236 W |
| 1130 S (broad)[b] | 1120 S (broad) |
| 800 M | 800 M |
| Polyaniline (2A) | |
| ~3300 W | 3440 M (broad) |
| 1594 S | 1590 S |
| 1500 S | 1487 M |
| 1381 M | 1375 S |
| 1300 S | 1300 S |
| | 1236 W |
| 1216 Very weak | 1215 M |
| 1146 S | 1140 S |
| 818 M (broad) | 827 M |

[a]Obscured by a broad water band.
[b]Infrared absorption of $ClO_4^-$ also falls at approximately 1050–1170 $cm^{-1}$.

EXAMPLE 10

Effect of Aqueous HCl Doping on the Conductivity of Polyaniline (2A) $[=(C_6H_4)=N-(C_6H_4)-N=]_x$ Samples of polyaniline (2A) powder synthesized according to Example 8 (each about 0.2 g) were contacted by 20 ml of aqueous HCl solutions having concentrations of 10.0M, 1.0M, $1.0 \times 10^{-1}$M, $5.0 \times 10^{-2}$M, $2.5 \times 10^{-2}$M, $1.0 \times 10^{-2}$M, $7.5 \times 10^{-3}$M, $5.0 \times 10^{-3}$M, $2.5 \times 10^{-3}$M, $1.0 \times 10^{-3}$M, $1.0 \times 10^{-4}$M, $1.0 \times 10^{-5}$M and $1.0 \times 10^{-6}$M for about 6 hours. Each sample was filtered and exposed to dynamic vacuum for at least 12 hours. The conductivity of each sample was measured as a compressed pellet. Infrared spectra and elemental analysis for nitrogen and chlorine were obtained for selected samples. When the conductivity was larger than $10^{-3}$ $ohm^{-1}cm^{-1}$, then it was measured by a Van der Pauw 4-probe apparatus. When the conductivity was less than $10^{-3}$ $ohm^{-1}cm^{-1}$, then it was measured by a 2-probe apparatus.

Samples for infrared studies were ground uniformly with KBr powder (Aldrich Chemical Company) in a dry atmosphere. The Fourier Transform infrared spectra (IBM Instruments Inc. IR/97 Spectrometer) were obtained, special attention being paid to the wavenumber of one of the ring breathing modes of the phenyl nucleus. Conductivities, infrared data and elemental analysis are given below:

| Concentration (M) | Conductivity ($ohm^{-1} cm^{-1}$) | Ring Breathing Mode ($cm^{-1}$) |
|---|---|---|
| $1.0 \times 10^1$ | 3.87 | 1561 |
| $1.0 \times 10^0$ | 8.41 | 1566 |
| $1.0 \times 10^{-1}$ | 1.21 | 1568 |
| $5.0 \times 10^{-2}$ | 3.40 | 1577 |
| $1.0 \times 10^{-2}$ | $4.28 \times 10^{-3}$ | |
| $5.0 \times 10^{-3}$ | $6.51 \times 10^{-6}$ | 1581 |
| $1.0 \times 10^{-3}$ | $4.94 \times 10^{-9}$ | 1586 |
| $1.0 \times 10^{-4}$ | $6.63 \times 10^{-9}$ | 1587 |
| $1.0 \times 10^{-5}$ | $1.29 \times 10^{-9}$ | 1587 |
| $1.0 \times 10^{-6}$ | $2.73 \times 10^{-9}$ | |

Results obtained on a different sample of polyaniline (2S) prepared by the same method:

| Concentration (M) | Conductivity ($ohm^{-1} cm^{-1}$) |
|---|---|
| $1.0 \times 10^1$ | 23.0 (3.91) |
| $1.0 \times 10^0$ | 10.2 (6.24) |
| $1.0 \times 10^{-1}$ | 2.4 (1.40) |
| $5.0 \times 10^{-2}$ | $7.30 \times 10^{-1}$ ($3.50 \times 10^{-1}$) |
| $2.5 \times 10^{-2}$ | $0.82 \times 10^{-3}$ ($1.46 \times 10^{-3}$) |
| $1.0 \times 10^{-2}$ | $3.39 \times 10^{-5}$ ($2.40 \times 10^{-5}$) |
| $7.5 \times 10^{-3}$ | $2.38 \times 10^{-6}$ ($1.84 \times 10^{-6}$) |
| $5.0 \times 10^{-3}$ | $9.78 \times 10^{-7}$ ($3.87 \times 10^{-7}$) |
| $2.5 \times 10^{-3}$ | $8.70 \times 10^{-8}$ ($6.71 \times 10^{-8}$) |
| $1.0 \times 10^{-3}$ | $1.23 \times 10^{-8}$ ($8.99 \times 10^{-9}$) |
| $1.0 \times 10^{-4}$ | $5.01 \times 10^{-9}$ ($1.60 \times 10^{-8}$) |
| $1.0 \times 10^{-5}$ | $6.25 \times 10^{-9}$ ($1.51 \times 10^{-9}$) |
| $1.0 \times 10^{-6}$ | $6.97 \times 10^{-9}$ ($2.24 \times 10^{-9}$) |

The values in parentheses are the conductivities obtained after additional dynamic pumping for 24 hours of the polyaniline pellet used for the initial conductivity measurement. The conductivity values given in parenthesis were used in constructing the curve given in FIG. 2 which also relates the shift in ring breathing mode absorption to level of doping for forms 2A and 2S.

| Molarity of HCl | Elemenal Analysis | | | Conductivity ($ohm^{-1} cm^{-1}$) |
|---|---|---|---|---|
| | N (%) | Cl (%) | Cl/N Mole Ratio | |
| $5 \times 10^{-2}$ | 12.36 | 4.97 | 0.159 | 0.35 |
| $5 \times 10^{-2}$ | 12.38 | 16.15 | 0.514 | 2.51 |
| $5 \times 10^{-2}$ | 11.50 | 12.59 | 0.432 | 5.69 |
| $7.5 \times 10^{-3}$ | 12.80 | 0.33 | 0.0102 | $1.84 \times 10^{-6}$ |
| $1.0 \times 10^{-3}$ | 12.76 | <0.02 | $<6.18 \times 10^{-4}$ | $8.99 \times 10^{-9}$ |
| $1.0 \times 10^{-3}$ | 5.10 | 0.15 | $3.92 \times 10^{-3}$ | $2.30 \times 10^{-10}$ |

Figure 2:
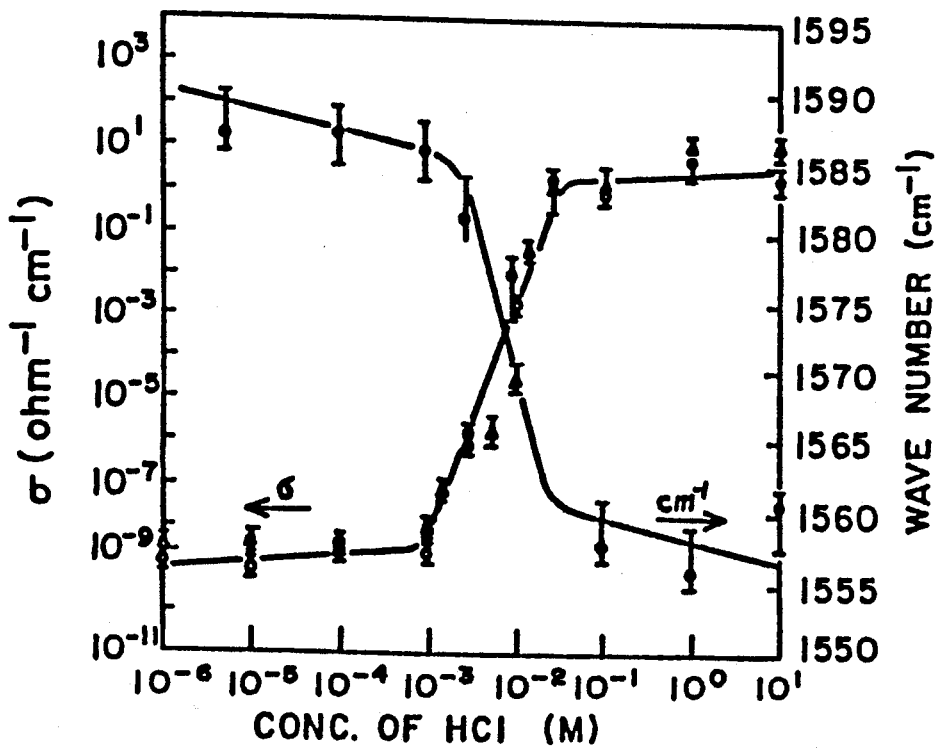
FIG. 2 depicts the infrared spectral shift in the polyaniline ring breathing mode and change in conductivity with extent of doping for certain forms of polyaniline.
Figure 3:
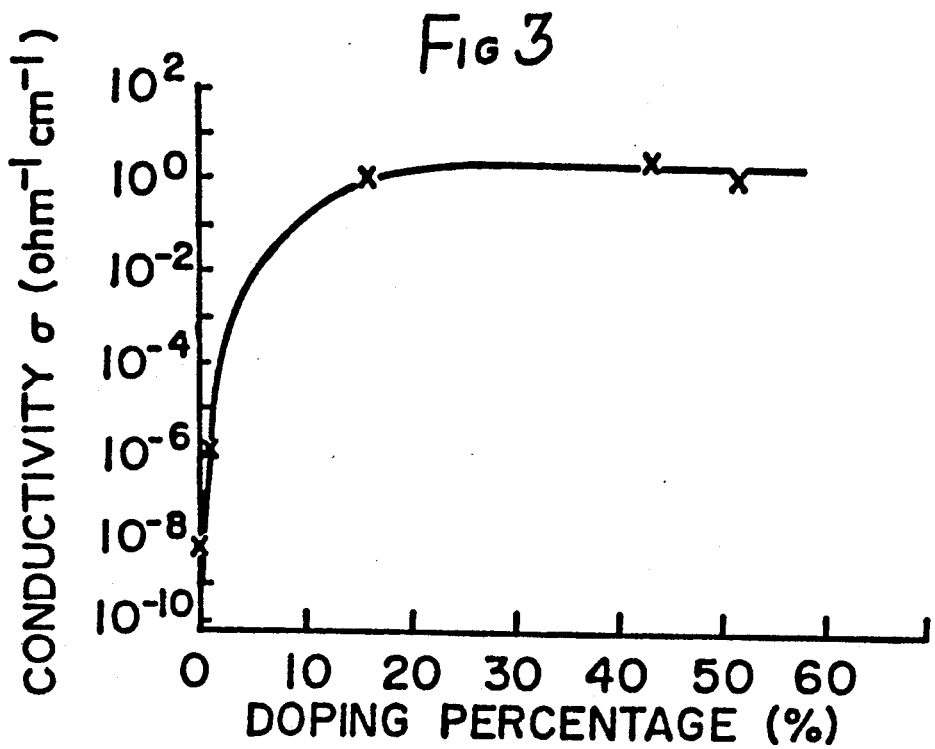
FIG. 3 gives the relationship between conductivity and doping percentage of a polyaniline.

The 2A form of polyaniline undergoes a reversible semiconductor to metal transition, when treated with different concentrations of aqueous HCl, to form polyaniline (2S) as shown in FIG. 2. This curve, also shows that the conductivity of polyaniline can be easily controlled by varying the concentration of HCl. FIG. 3, based on elemental analysis and conductivity data given above, demonstrates that the semiconductor to metal transition begins at about 10 mole % dopant and saturates at about 15.0 mole % dopant (given by Cl/N ratio $\times$ 100 in the polymer).

After doping the polyaniline 2A form, the wavenumbers of the ring breathing mode shift downward from about 1590 $cm^{-1}$ to about 1550 $cm^{-1}$. The cause of this shift is believed to be related to the extent of protonation of the polyaniline, influencing the bond forces of the carbon-carbon bonds of the phenyl nucleus. These results are consistent with the semiconductor-metal curve of FIG. 2.

EXAMPLE 11

Cycling Studies of a Battery Cell Using Electrochemically Grown Polyaniline (2S)

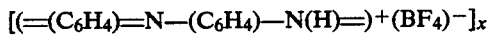

Electrochemically grown polyaniline 2S film was prepared as described in Example 2 to form a 3.1 mg piece of $[(=(C_6H_4)=N-(C_6H_4)-N(H)=)^+(BF_4)^-]_x$ on both sides of a piece of Pt foil (3.2 cm$^2$). This was used as a cathode in conjunction with an amalgamated Zn anode. The zinc was amalgamated by cleaning a strip of zinc metal in dilute HCl and washing with distilled water. It was then dipped into a saturated solution of HgCl$_2$ in water for about 5 seconds and then washed in distilled water. The electrodes were placed in an aqueous electrolyte consisting of 1.0M ZnCl$_2$, 0.5M NH$_4$Cl, 0.1M NaBF$_4$ (pH of about 5). This cell was deep discharged and charged between 1.40 V and 0.85 V (vs. Zn) at a constant current density of 0.05 mA/cm$^2$. Each charge step took about 105 minutes and each discharge took about 105 minutes. The Coulombic efficiency for each cycle during the first 46 cycles was in the range of about 92-99%. The coulombic capacity at the end of 46 cycles was 96% that of the first cycle. The discharge and charge current densities were then changed to 0.1 mA/cm$^2$ for the next 155 cycles to give a total of 201 cycles. Each charge step took 48 minutes and each discharge step took 48 minutes. The coulombic efficiency for each cycle remained within the range of about 93-96%. The capacity after the 201st cycle was 92% that of the 47th cycle.

EXAMPLE 12

Cycling Studies at Various Discharge Rates of a Battery Cell Using Electrochemically Grown Polyaniline (2S) of Composition

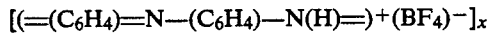

Before the studies in Example 11 were carried out the polyaniline (2S) of that example was found to exhibit an open circuit voltage, $V_{oc}$, of 1.4 V and a short circuit current ($I_{sc}$) of about 150 mA/cm$^2$ in the battery cell. The cell was discharged at a constant current of 0.1 mA/cm$^2$ of Pt using a Princeton Applied Research Galvanometer (Model 179) from 1.4 V to 0.8 V. It was then charged with 1.125 coulombs and was immediately discharged at constant current densities of 0.1, 0.5, 1.0, 5.0, 10.0 mA/cm$^2$ of Pt to 0.70 V. It was recharged with 1.125 coulombs after each discharge. Energy density and power density values based only on the weight of polyaniline (2S) of assumed approximate composition (from the analytical data in Example 6) $[(=(C_6H_4)=N-(C_6H_4)-N(H)=)^+(BF_4)^-]_x$ were as follows:

| Current Density mA/cm$^2$ | Discharge Constant Current | Average Energy Voltage $V_d$ | Power Density Wh/kg | Density W/kg |
|---|---|---|---|---|
| 0.1 | 0.32 | 1.02 | 102.2 | 105.3 |
| 0.5 | 1.6 | 1.02 | 80.0 | 104.3 |
| 1.0 | 3.2 | 1.01 | 74.8 | 526.5 |

-continued

| Current Density mA/cm$^2$ | Discharge Constant Current | Average Energy Voltage $V_d$ | Power Density Wh/kg | Density W/kg |
|---|---|---|---|---|
| 5.0 | 16.0 | 0.918 | 58.4 | 4,738 |
| 10.0 | 32.0 | 0.885 | 38.7 | 9,135 |

EXAMPLE 13

Stability of a Battery Cell Using a Cathode of Electrochemically Grown Polyaniline (2S) of Assumed Composition $[(=(C_6H_4)=N-(C_6H_4)-N(H)=)^+(BF_4)^-]_x$ During a Stand Time of One Month In order to determine the stability in its charged state of a cell constructed as described in Example 11, the cell was first charged from 0.70 V to 1.35 V at 0.1 mA/cm$^2$ of Pt. Six hours after termination of charging, the cell potential reached an equilibrium value of 1.29 V. The battery was then permitted to stand for 30 days. Its potential dropped only to 1.21 V. The battery was then discharged to 0.70 V at the same current rate as the charging rate demonstrating that the battery has excellent stability. This cell after complete discharge was charged again at 0.1 mA/cm$^2$ of Pt to 1.40 V and permitted to stand for 1 additional month in the electrolyte solution. At the end of this time the open circuit voltage was 1.20 V. The cell was discharged at a constant current of 0.1 mA/cm$^2$ of Pt from 1.20 V to 0.70 V. A coulombic efficiency of 98% was obtained again showing the excellent stability and shelf life of this type of polyaniline cell.

EXAMPLE 14

Effect of NaBF$_4$ and O$_2$ on the Performance of a Battery-Cell Using an Electrochemically Synthesized Film of Polyaniline (2S)

A film of polyaniline (2S) (1 cm$^2$; 2.9 mg) was prepared electrochemically according to the method of Example 1. A battery cell was constructed using a 1.0M ZnCl$_2$+0.5M NH$_4$Cl electrolyte. No NaBF$_4$ was employed. An amalgamated zinc anode was prepared as described in Example 11 and separated from the polyaniline electrode by about 1 cm.

In Examples 11 and 12, the electrolyte had been exposed to the air. In this experiment, argon was bubbled through the electrolyte for 1 hour and the electrolyte was covered by an argon atmosphere during the experiment. Cycling was carried out between 1.40 V and 0.80 V for 12 complete cycles. Charge and discharge current densities of 0.1 mA/cm$^2$ were used.

In each cycle the coulombic efficiency was between 109% and 111%. The capacity of the cell on the 12th discharge was 100% that of the first discharge. It is believed that, despite the deaeration of the electrolyte by argon, oxidation of a reduced form of polyaniline occurred because of the accidental presence of traces of air in view of the coulombic efficiencies having a value greater than 100%. If the discharge had been terminated at 0.85 V instead of 0.80 V, as in Example 11, about 100% coulombic efficiency would have been expected in each cycle. It is possible that the greater degree of reduction of the polyaniline at 0.80 V (as compared to 0.85 V) may have facilitated its oxidation by traces of oxygen.

EXAMPLE 15

Cycling Studies of a Battery Cell Using Polyaniline (2A) Electrochemically Synthesized from Polyaniline (2S)

A 3.2 mg sample (1 cm$^2$) of polyaniline (BF$_4^-$ anion) (2S) was synthesized as described in Example 1. The film was then converted to polyaniline form 2A by immersing it in a mixture of 10 ml of 0.5M KOH and 20 ml of methanol for 3 hours. The film was subsequently washed in a solvent consisting of 2 volumes of methanol and one volume of water and vacuum dried for 6 hours. The weight of the film was found to be 2.0 mg. As shown in Example 8, this procedure converts polyaniline (2S) to polyaniline (2A).

An electrochemical cell was constructed using this electrode and an amalgamated Zn (described in Example 11) electrode in 10 ml of aqueous solution consisting of 1.0M ZnCl$_2$ and 0.5 NH$_4$Cl. This solution was degassed for 3 hours by bubbling argon gas through it prior to use. The cell was constructed under a N$_2$ atmo-

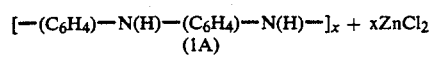

sphere inside a glove bag. The open circuit cell potential was 1.18 V (vs. Zn). The cell was then discharged at a constant current of 0.1 mA to 0.70 V (vs. Zn) and held at a constant potential of 0.8 V (vs. Zn) for 12 hours. The cell was then charged at a constant current of 0.1 mA to 1.40 V (vs. Zn) and discharged immediately at the same constant current rate to 0.80 V. The coulombic recovery was 87.5%. The cell was held at a constant potential of 0.80 V for about 12 hours. This gave a total coulombic recovery of 94.8%. These results show that polyaniline (2A) synthesized from electrochemically prepared polyaniline (2S) films can also be used as a cathode in rechargeable polyaniline batteries.

EXAMPLE 16

Recycling Battery Studies Using Chemically Made Polyaniline (2S), [(=(C$_6$H$_4$)=N—(C$_6$H$_4$)—N(H)=)$^+$(BF$_4$)$^-$]$_x$, with a

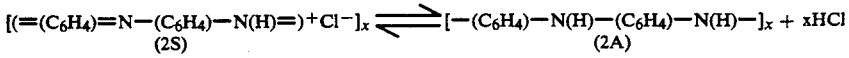

Binder

A 7% (by weight) solution of ethylene propylene terpolymer binder in cyclohexane was prepared. This was added dropwise to a mixture of 25 mg of polyaniline (2S) prepared according to the method given in Example 6 and 2.5 mg of carbon powder (Gulf Oil Chemical Co.). Sufficient binder solution was added so that when the mixture was dry, it would consist of about 3% by weight of binder.

The mixture was painted onto approximately 1.5 cm$^2$ of a carbon rod, dried under vacuum and used to construct a cell with 10 ml of 1.0M ZnCl$_2$ and 0.5M NH$_4$Cl in an aqueous electrolyte solution (pH about 5) in conjunction with an amalgamated Zn electrode. The two electrodes were 1 cm apart. An open circuit voltage of 1.40 V (vs. Zn) and a short circuit current of about 150 mA were observed. The cell was cycled between 1.40 V and 0.70 V (vs. Zn) at 1 mA for 19 cycles. Coulombic efficiencies of over 95% and approximately 100% retention in capacity were observed.

The energy density for this discharge step calculated from the weight of the polyaniline (2S) employed and the weight of the Zn and HCl consumed (both based on the number of coulombs passed during the discharge) is 72 Whr/kg. The average discharge voltage is about 1.0 V. The discharge reaction is taken to be

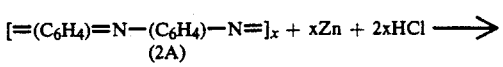

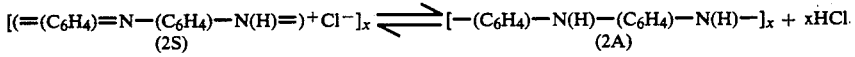

It should be noted that, as can be seen from Example 10, when the original 25 mg of [(=(C$_6$H$_4$)=N—(C$_6$H$_4$)—N(H)=)$^+$(BF$_4$)$^-$]$_x$, (2S), is placed in the large volume of the electrolyte at pH about 5, it dissociates to give 17 mg of the corresponding form 2A, according to the equation

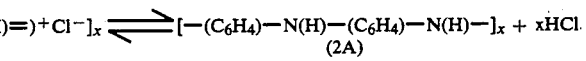

These results show that polyaniline (2S) can act as an excellent cathode in a rechargeable battery cell.

EXAMPLE 17

Recycling Battery Studies Using Chemically Made Polyaniline (2A), [=(C$_6$H$_4$)=N—(C$_6$H$_4$)—N=]$_x$, with a Binder This study was carried out in an identical manner to that of Example 16 except that 19 mg of polyaniline (2A), prepared as described in Example 8, was used and the polyaniline was mixed with 20% by weight of carbon powder. After allowing the polyaniline cathode to stand in the electrolyte for 1 day, the cell was discharged at a constant current of 0.8 mA to 0.6 V. A total of 5 complete charging and discharging cycles between 1.40 V and 0.6 V were carried out. The coulombic efficiencies and capacity after each discharge cycle were as follows:

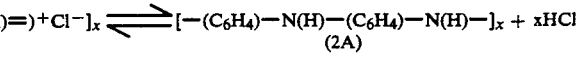

Both the coulombic efficiencies and capacity values are excellent. The capacity actually increases slightly on cycling. This may be due to increased penetration of the electrolyte through the binder exposing more polyaniline.

EXAMPLE 18

Recycling Battery Studies Using Chemically Made Polyaniline (2A), [=(C$_6$H$_4$)=N—(C$_6$H$_4$)—N=]$_x$ with a Binder in a Buffered Electrolyte This study was carried out in an identical manner to that described in Example 17 except that 6 mg of polyaniline (2A) were used. The electrolyte consisted of 10 ml of an aqueous solution of 3.0M acetic acid, 3.0M sodium acetate, 0.5M ammonium chloride and 1.0M zinc chloride. The use of this buffer system may suppress the increase in acidity around the polyaniline particles during the charging process. The resultant solution has a pH of 4.0. The cell exhibited an open circuit voltage of 1.30 V (vs. Zn) and a short circuit current of ca. 201 mA. The cell was discharged at a constant current of 1 mA to 0.5 V (vs. Zn) and then charged to 1.40 V (vs. Zn) and discharged back to 0.5 V at a constant current of 0.5 mA. This cell was cycled 20 times between 1.40 V and 0.6 V at a constant current of 0.5 mA. Excellent retention in capacity and 100% coulombic efficiency was obtained.

| Cycle # | Coulombs in $Q_{in}$ | Coulombs out $Q_{out}$ | Coulombic Efficiency % ($Q_{out}/Q_{in}$) | Capacity $\frac{Q_{N(out)}}{Q_{5(out)}}$ |
|---|---|---|---|---|
| 1 | 1.89 | 1.89 | 100 | |
| 5 | 1.80 | 1.80 | 100 | 100 |
| 10 | 1.80 | 1.80 | 100 | 100 |
| 15 | 1.80 | 1.80 | 100 | 100 |
| 20 | 1.80 | 1.80 | 100 | 100 |

If the first four discharge cycles are neglected, 100% retention of capacity is observed. The acidity of the solution remained at pH=4.0 both at the end of the charging step and at the end of the 20th discharging step.

EXAMPLE 19

Stability of a Cell of the Type Described in Example 18

A cell constructed identically to that described in Example 18 was made except that 13 mg of polyaniline (2A) were employed. The open circuit voltage without any charging was 1.32 V. This value remained essentially constant for 6 days, the potential after the sixth day being 1.30 V. Hence the acetic acid/acetate buffer solution employed does not affect the stability of the cell in its charged state.

EXAMPLE 20

Recycling Studies of a Cell Containing Polyaniline (2S) in a Flashlight Battery Configuration Three hundred milligrams of polyaniline (2S), $[(=(C_6H_4)=N—(C_6H_4)—N(H)=)^+Cl^-]_x$ synthesized as described in Example 5 were mixed with 10% by weight carbon black and formed into a paste with 0.5 cc of aqueous electrolyte consisting of 1.0M $ZnCl_2$ and 0.5M $NH_4Cl$. The cell was constructed from a Commercial "AAA" (Eveready) type flashlight battery by removing all electroactive materials from the cell and replacing them with the above paste. The Zn casing was lightly amalgamated before insertion of the paste. The polyaniline paste was separated from the Zn can by a glass filter paper spacer. A carbon rod (1.5 cm$^2$) was inserted as a current collector, surrounded by the polyaniline paste and the top of the cell was sealed with molten paraffin wax. The cell exhibited an open circuit voltage, $V_{oc}$, of 1.40 V (vs. Zn) and a short circuit current of ca. 800 mA. The cell was discharged at a constant current of 5 mA from 1.4 V to 0.5 V (vs. Zn). This cell was cycled (i.e. sequential charging and discharging) at a constant current of 5 mA, showing a coulombic efficiency between 90–98% with over 80% retention in capacity at the end of the 6th cycle. Each charge and discharge cycle took approximately 6 hours. The cell acts as a rechargeable battery.

The energy density for the first discharge step based on the weight of the polyaniline (2S) employed and the weight of the Zn and HCl consumed (from the number of coulombs passed during the discharge) is 63.5 Whr/kg. The average discharge voltage was 1.0 V. The discharge reaction was taken to be

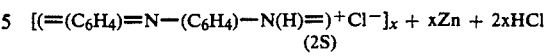
(2S)

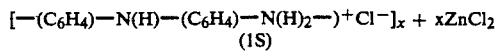
(1S)

It should be noted that when the original 300 mg of $[(=(C_6H_4)=N—(C_6H_4)—N(H)=)^+Cl^-]_x$, (2S), is placed in the very small volume of electrolyte very little dissociation to give form 2A, i.e. $[=(C_6H_4)=N—(C_6H_4)—N=]_x$ plus HCl was expected to occur. For the completely packaged cell (including weight of the casing, wax, etc.) the experimental energy density was calculated to be ca. 25 Whr/kg.

EXAMPLE 21

Characteristics of a Cell Containing Polyaniline (2A) in a Flashlight Battery Configuration A preliminary experiment was carried out using polyaniline (2A) synthesized as described in Example 8. The cell was constructed from an "AAA" type flashlight battery as described for Example 20 except that 200 mg of polyaniline (2A) were employed with 20% by weight of carbon black. The cell exhibited an open circuit voltage $V_{oc}$ of 1.22 V and a short circuit current of ca. 247 mA. The cell was discharged from 1.2 volt to 0.80 V (vs. Zn) at a constant current of 5 mA for somewhat less than 3 hours. A discharge curve with an excellent "plateau" region was obtained.

EXAMPLE 22

Oxidizing Effect of 1N $H_2SO_4$ on Polyaniline

Two identical battery cells were constructed using electro chemically synthesized polyaniline (2S) as described in Example 1. Each polyaniline electrode was discharged to 0.8 V at a constant current of 0.1 mA/cm$^2$ with an amalgamated zinc anode in a 1.0M $ZnCl_2 + 0.5M$ $NH_4Cl$ electrolyte, followed by a constant potential discharge at 0.80 V overnight. The polyaniline was converted to form 1A by this process. The anode and cathode were removed from one of the cells and placed in a solution of 1M $ZnCl_2 + 0.5M$ $NH_4Cl + 1N$ $H_2SO_4$. Argon had previously been bubbled through this solution for 1 hour. This new cell was placed in an argon atmosphere and the $V_{oc}$ (vs. Zn) measured over 24 hours. An identical procedure was used with a second set of anode and cathode electrodes placed in an electrolyte of 1M $ZnCl_2 + 0.5M$ $NH_4Cl + 1N$ HCl; the $V_{oc}$ was monitored for 24 hours. The results are given in FIG. 4. Even in an inert atmosphere, 1N $H_2SO_4$ oxidizes the polyaniline, to a considerable extent while 1N HCl has no observable oxidizing effect on the polyaniline (1A). One N $H_2SO_4$ should increase the degree of oxidation of form (1S) by about 0.2 V. Experimentally, it increased the potential of form (1S) from 0.830 V (vs. Zn) to 1.105 V (vs. Zn) i.e. by 0.275 V. It is apparent that 1N $H_2SO_4$ as used by Jozefowicz, et al., is unsuitable as an electrolyte for polyaniline since it oxidizes the polyaniline spontaneously.

EXAMPLE 23

Cycling Study of Polyaniline (2S) in 1N $H_2SO_4$ Electrolyte

A cell was constructed under argon as described in Example 22 employing an electrolyte of 1N $H_2SO_4$ + 1M $ZnCl_2$ + 0.5M $NH_4Cl$. It was then cycled between 1.40 V and 0.80 V for 20 complete cycles. A cycling rate of 5 mV/sec was used. Both the coulombic efficiency and the capacity fell considerably during cycling as can be seen from the following data:

| Cycle Number | $Q_{in}$ (Coulombs) | $Q_{out}$ (Coulombs) | Coulombic Efficiency % ($Q_{out}/Q_{in}$) | Capacity % ($Q_{Nout}/Q_{1out}$) |
|---|---|---|---|---|
| 1  | 0.162 | 0.157 | 96.9 | 100  |
| 2  | 0.164 | 0.154 | 93.9 | 98.1 |
| 3  | 0.163 | 0.153 | 93.9 | 97.5 |
| 4  | 0.164 | 0.153 | 93.3 | 97.5 |
| 5  | 0.166 | 0.150 | 90.4 | 95.5 |
| 6  | 0.171 | 0.149 | 87.1 | 94.9 |
| 7  | 0.170 | 0.148 | 87.1 | 94.3 |
| 8  | 0.169 | 0.147 | 87.0 | 93.6 |
| 9  | 0.169 | 0.148 | 87.6 | 94.3 |
| 10 | 0.171 | 0.146 | 85.4 | 93.0 |
| 11 | 0.173 | 0.147 | 85.0 | 93.6 |
| 12 | 0.171 | 0.146 | 85.4 | 93.0 |
| 13 | 0.174 | 0.144 | 82.8 | 91.7 |
| 14 | 0.173 | 0.143 | 82.7 | 90.4 |
| 15 | 0.176 | 0.142 | 80.7 | 90.4 |
| 16 | 0.177 | 0.140 | 79.1 | 89.2 |
| 17 | 0.178 | 0.140 | 78.7 | 89.2 |
| 18 | 0.179 | 0.139 | 77.7 | 88.5 |
| 19 | 0.180 | 0.139 | 77.2 | 88.5 |
| 20 | 0.184 | 0.138 | 75.0 | 87.9 |

It is concluded that 1N $H_2SO_4$ as used by Jozefowicz, et al. in his battery studies is a poor electrolyte. Furthermore, the use of acidic aqueous solutions of pH below about 2 will not give a stable battery of long life.

EXAMPLE 24

Preparation of Electrolyte Solutions of Various pH Values

Electrolyte solutions which were 1.0M in $ZnCl_2$ and 0.5M in $NH_4Cl$ were prepared by placing 13.64 gm $ZnCl_2$ and 2.68 gm $NH_4Cl$ in a 100 ml volummetric flask. The flask was then filled to the 100 ml mark with dilute HCl having a carefully measured pH. Electrolyte solutions were prepared from distilled water (pH=6.5) and also from dilute aqueous HCl solutions of pH=0.0, 1.0, 2.0, 3.0, 4.0, 5.0 and 6.0.

EXAMPLE 25

Amalgamation of Zinc Electrode

One gram $HgCl_2$ (Fisher Scientific Company) was dissolved in 13.5 ml distilled water to form a saturated solution at room temperature. Zn metal (0.24 cm × 1 cm × 5 cm; Fisher Scientific Co.) was sanded, washed with distilled water and then washed with ca. $10^{-2}$M aqueous HCl. It was then placed into the $HgCl_2$ solution for about 5 seconds and washed with distilled water to remove excess $HgCl_2$.

EXAMPLE 26

Cyclic Voltammetry Studies of Polyaniline Cathodes in Electrolytes Having Various pH Values Cycling studies were carried out using an apparatus constructed with a polyaniline working electrode suspended in the electrolytes between an amalgamated zinc counter electrode and a zinc reference electrode. The electrolyte solution consisted of 10 to 15 ml of 1.0M $ZnCl_2$ + 0.5M $NH_4Cl$ solution prepared by dissolving the appropriate weight of anhydrous $ZnCl_2$ and $NH_4Cl$ in an HCl solution of a given pH.

Polyaniline (2S) (about 0.3 mg) was synthesized electrochemically on a Pt electrode (1.4 cm²) as described in Example 2. Standard cyclic voltammetry experiments were performed at a scan rate of 5 mV/second from 0.8 V to 1.4 V and back to 0.8 V. Each complete cycle (oxidation and reduction) took 4 minutes. The coulombs involved in the oxidation and reduction cycles were measured by a coulometer. The pH of each of the electrolytes studied was measured by a pH meter calibrated with commercial buffer solution at 1 pH unit higher and 1 pH unit lower than the buffered electrolyte being studied. Before the cyclic voltammetry experiments were commenced, the polyaniline was held at a constant potential of 0.8 V (vs. Zn) to convert it to the reduced form of polyaniline (2A or 2S, depending on the pH of the electrolyte).

Figure 5:
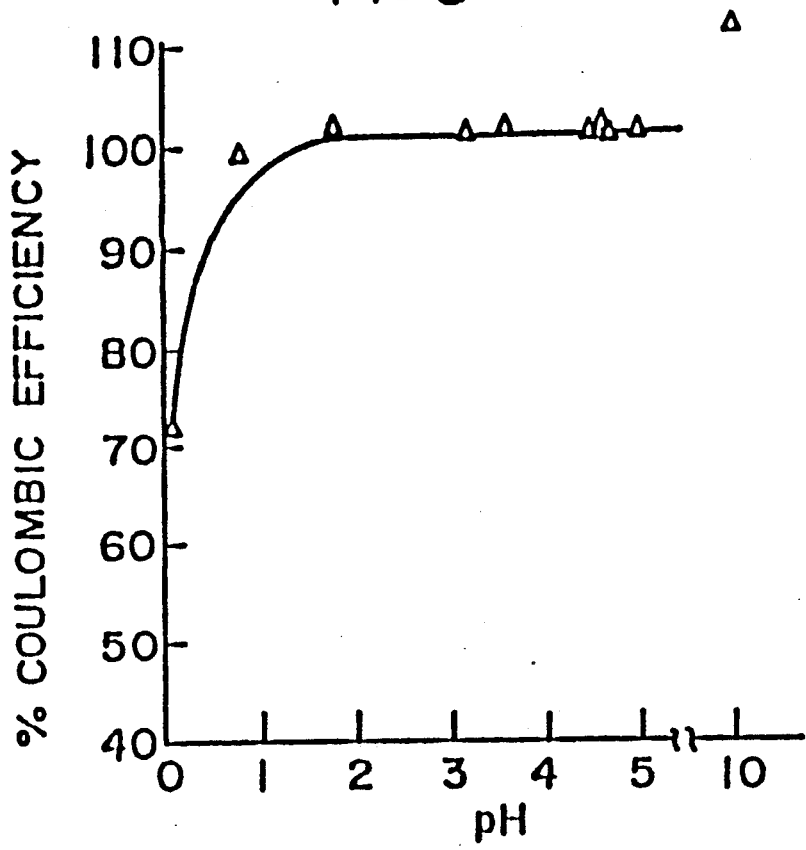
FIGS. 5 and 6 relate coulombic efficiencies and capacity for cyclic voltammetry studies at various pHs.
Figure 6:
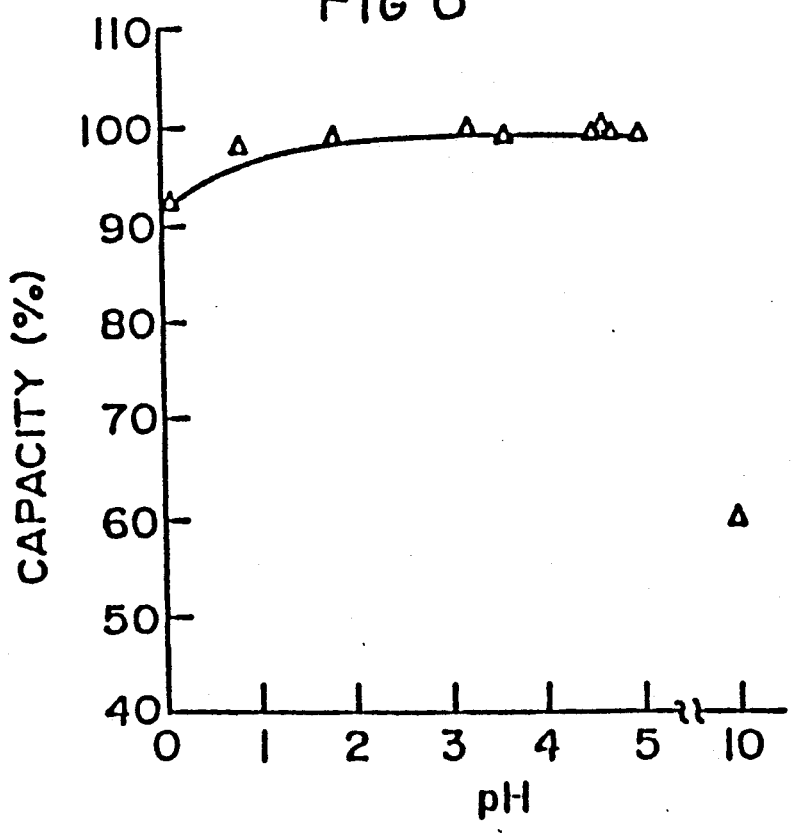

The results of 20 charge (oxidation)/discharge(reduction) cycles at various electrolyte pH values are given on the following pages. Results obtained after the 20th charge (oxidation)/discharge(reduction) cycle at various electrolyte pH values are depicted in FIGS. 5 and 6.

| Cycle Number | $Q_{in}$ (Coulombs) | $Q_{out}$ (Coulombs) | Coulombic Efficiency % ($Q_{out}/Q_{in}$) | Capacity % ($Q_{Nout}/Q_{2out}$) |
|---|---|---|---|---|
| (a) pH of electrolyte = 0.1 | | | | |
| 1  | 0.1387 | 0.09874 | 71.19 |        |
| 2  | 0.1295 | 0.1042  | 80.46 | 100.00 |
| 3  | 0.1268 | 0.1067  | 84.15 | 102.40 |
| 4  | 0.1257 | 0.1078  | 85.76 | 103.45 |
| 5  | 0.1247 | 0.1086  | 87.09 | 104.22 |
| 6  | 0.1245 | 0.1089  | 87.47 | 104.51 |
| 7  | 0.1249 | 0.1090  | 87.27 | 104.61 |
| 8  | 0.1243 | 0.1092  | 87.85 | 104.80 |
| 9  | 0.1249 | 0.1081  | 86.55 | 103.74 |
| 10 | 0.1260 | 0.1078  | 85.56 | 103.45 |
| 11 | 0.1259 | 0.1078  | 84.65 | 103.45 |
| 12 | 0.1264 | 0.1070  | 84.65 | 102.69 |
| 13 | 0.1269 | 0.1062  | 83.69 | 101.92 |
| 14 | 0.1274 | 0.1059  | 83.12 | 101.63 |
| 15 | 0.1278 | 0.1048  | 82.00 | 100.58 |
| 16 | 0.1289 | 0.1039  | 80.61 | 99.71  |
| 17 | 0.1296 | 0.1030  | 79.48 | 98.84  |
| 18 | 0.1311 | 0.1008  | 76.89 | 96.74  |
| 19 | 0.1325 | 0.09898 | 74.70 | 94.99  |
| 20 | 0.1341 | 0.09608 | 71.65 | 92.21  |
| (b) pH of electrolyte = 0.8 | | | | |
| 1  | 0.1149 | 0.1158 | 100.78 |        |
| 2  | 0.1145 | 0.1158 | 101.14 | 100.00 |
| 3  | 0.1149 | 0.1156 | 100.61 | 99.83  |
| 4  | 0.1143 | 0.1157 | 101.22 | 99.91  |
| 5  | 0.1147 | 0.1154 | 100.61 | 99.65  |
| 6  | 0.1147 | 0.1153 | 100.52 | 99.57  |
| 7  | 0.1147 | 0.1151 | 100.35 | 99.40  |
| 8  | 0.1147 | 0.1149 | 100.17 | 99.22  |
| 9  | 0.1148 | 0.1145 | 99.74  | 98.88  |
| 10 | 0.1147 | 0.1145 | 99.82  | 98.88  |
| 11 | 0.1149 | 0.1144 | 99.56  | 98.79  |
| 12 | 0.1149 | 0.1142 | 99.39  | 98.62  |
| 13 | 0.1151 | 0.1140 | 99.04  | 98.45  |
| 14 | 0.1151 | 0.1139 | 98.96  | 98.36  |
| 15 | 0.1151 | 0.1139 | 98.96  | 98.36  |
| 16 | 0.1151 | 0.1137 | 98.78  | 98.19  |
| 17 | 0.1153 | 0.1136 | 98.83  | 98.10  |
| 18 | 0.1150 | 0.1136 | 98.78  | 98.10  |
| 19 | 0.1153 | 0.1134 | 98.35  | 97.93  |
| 20 | 0.1153 | 0.1134 | 98.35  | 97.93  |
| (c) pH of electrolyte = 1.8 | | | | |

-continued

| Cycle Number | $Q_{in}$ (Coulombs) | $Q_{out}$ (Coulombs) | Coulombic Efficiency % ($Q_{out}/Q_{in}$) | Capacity % ($Q_{Nout}/Q_{2out}$) |
|---|---|---|---|---|
| 1 | 0.1117 | 0.1114 | 99.73 | |
| 2 | 0.1103 | 0.1117 | 101.27 | 100.00 |
| 3 | 0.1103 | 0.1115 | 101.09 | 99.82 |
| 4 | 0.1100 | 0.1113 | 101.18 | 99.64 |
| 5 | 0.1099 | 0.1110 | 101.00 | 99.37 |
| 6 | 0.1095 | 0.1111 | 101.46 | 99.46 |
| 7 | 0.1093 | 0.1110 | 101.56 | 99.37 |
| 8 | 0.1090 | 0.1108 | 101.65 | 99.19 |
| 9 | 0.1091 | 0.1107 | 101.47 | 99.10 |
| 10 | 0.1089 | 0.1104 | 101.38 | 98.84 |
| 11 | 0.1088 | 0.1106 | 101.65 | 99.02 |
| 12 | 0.1088 | 0.1105 | 101.56 | 98.93 |
| 13 | 0.1088 | 0.1104 | 101.47 | 98.84 |
| 14 | 0.1087 | 0.1103 | 101.47 | 98.75 |
| 15 | 0.1087 | 0.1104 | 101.56 | 98.84 |
| 16 | 0.1087 | 0.1103 | 101.47 | 98.75 |
| 17 | 0.1085 | 0.1093 | 100.74 | 97.85 |
| 18 | 0.1086 | 0.1102 | 101.47 | 98.66 |
| 19 | 0.1086 | 0.1101 | 101.38 | 98.57 |
| 20 | 0.1087 | 0.1101 | 101.29 | 98.57 |
| (d) pH of electrolyte = 3.2 | | | | |
| 1 | 0.1196 | 0.1194 | 99.83 | |
| 2 | 0.1187 | 0.1196 | 100.76 | 100.00 |
| 3 | 0.1185 | 0.1196 | 100.93 | 100.00 |
| 4 | 0.1183 | 0.1196 | 101.10 | 100.00 |
| 5 | 0.1183 | 0.1195 | 101.01 | 99.92 |
| 6 | 0.1180 | 0.1194 | 101.19 | 99.83 |
| 7 | 0.1179 | 0.1194 | 101.27 | 99.83 |
| 8 | 0.1180 | 0.1193 | 101.10 | 99.75 |
| 9 | 0.1179 | 0.1192 | 101.10 | 99.67 |
| 10 | 0.1179 | 0.1191 | 101.02 | 99.58 |
| 11 | 0.1180 | 0.1191 | 100.93 | 99.58 |
| 12 | 0.1178 | 0.1191 | 101.10 | 99.58 |
| 13 | 0.1179 | 0.1190 | 100.93 | 99.50 |
| 14 | 0.1179 | 0.1190 | 100.93 | 99.50 |
| 15 | 0.1178 | 0.1190 | 101.02 | 99.50 |
| 16 | 0.1178 | 0.1188 | 100.85 | 99.33 |
| 17 | 0.1177 | 0.1190 | 101.10 | 99.50 |
| 18 | 0.1178 | 0.1189 | 100.93 | 99.41 |
| 19 | 0.1178 | 0.1187 | 100.76 | 99.25 |
| 20 | 0.1175 | 0.1187 | 101.02 | 99.25 |
| (e) pH of electrolyte = 3.6 | | | | |
| 1 | 0.1062 | 0.1076 | 101.32 | |
| 2 | 0.1055 | 0.1076 | 101.99 | 100.00 |
| 3 | 0.1054 | 0.1075 | 101.99 | 99.91 |
| 4 | 0.1051 | 0.1074 | 102.19 | 99.81 |
| 5 | 0.1053 | 0.1073 | 101.90 | 99.72 |
| 6 | 0.1051 | 0.1071 | 101.90 | 99.54 |
| 7 | 0.1052 | 0.1070 | 101.71 | 99.44 |
| 8 | 0.1048 | 0.1070 | 102.09 | 99.44 |
| 9 | 0.1048 | 0.1070 | 102.09 | 99.44 |
| 10 | 0.1051 | 0.1068 | 101.62 | 99.26 |
| 11 | 0.1053 | 0.1067 | 101.33 | 99.16 |
| 12 | 0.1051 | 0.1067 | 101.52 | 99.16 |
| 13 | 0.1049 | 0.1067 | 101.72 | 99.16 |
| 14 | 0.1049 | 0.1067 | 101.72 | 99.16 |
| 15 | 0.1046 | 0.1065 | 101.82 | 98.98 |
| 16 | 0.1051 | 0.1064 | 101.24 | 98.88 |
| 17 | 0.1052 | 0.1065 | 101.24 | 98.98 |
| 18 | 0.1052 | 0.1064 | 101.14 | 98.88 |
| 19 | 0.1049 | 0.1064 | 101.43 | 98.88 |
| 20 | 0.1049 | 0.1063 | 101.33 | 98.79 |
| (f) pH of electrolyte = 4.5 | | | | |
| 1 | 0.1178 | 0.1191 | 101.10 | |
| 2 | 0.1179 | 0.1197 | 101.53 | 100.00 |
| 3 | 0.1180 | 0.1197 | 101.44 | 100.00 |
| 4 | 0.1182 | 0.1196 | 101.84 | 99.92 |
| 5 | 0.1180 | 0.1195 | 101.84 | 99.83 |
| 6 | 0.1180 | 0.1197 | 101.44 | 100.00 |
| 7 | 0.1178 | 0.1195 | 101.44 | 99.83 |
| 8 | 0.1177 | 0.1199 | 101.77 | 100.17 |
| 9 | 0.1179 | 0.1193 | 101.19 | 99.67 |
| 10 | 0.1178 | 0.1193 | 101.27 | 99.67 |
| 11 | 0.1178 | 0.1193 | 101.27 | 99.67 |
| 12 | 0.1177 | 0.1191 | 101.19 | 99.50 |
| 13 | 0.1176 | 0.1188 | 101.02 | 99.25 |
| 14 | 0.1174 | 0.1187 | 101.11 | 99.16 |
| 15 | 0.1176 | 0.1187 | 100.94 | 99.16 |
| 16 | 0.1174 | 0.1188 | 101.19 | 99.25 |
| 17 | 0.1172 | 0.1187 | 101.28 | 99.16 |
| 18 | 0.1173 | 0.1187 | 101.19 | 99.16 |
| 19 | 0.1173 | 0.1185 | 101.02 | 99.00 |
| 20 | 0.1174 | 0.1185 | 100.94 | 99.00 |
| (g) pH of electrolyte = 4.6 | | | | |
| 1 | 0.1164 | 0.1178 | 101.20 | |
| 2 | 0.1163 | 0.1179 | 101.38 | 100.00 |
| 3 | 0.1171 | 0.1181 | 100.85 | 100.17 |
| 4 | 0.1160 | 0.1179 | 101.64 | 100.00 |
| 5 | 0.1160 | 0.1175 | 101.29 | 99.66 |
| 6 | 0.1157 | 0.1177 | 101.73 | 99.83 |
| 7 | 0.1160 | 0.1177 | 101.47 | 99.83 |
| 8 | 0.1159 | 0.1177 | 101.55 | 99.83 |
| 9 | 0.1159 | 0.1177 | 101.55 | 99.83 |
| 10 | 0.1159 | 0.1175 | 101.38 | 99.66 |
| 11 | 0.1158 | 0.1175 | 101.47 | 99.66 |
| 12 | 0.1158 | 0.1174 | 101.38 | 99.58 |
| 13 | 0.1158 | 0.1172 | 101.21 | 99.41 |
| 14 | 0.1156 | 0.1173 | 101.47 | 99.49 |
| 15 | 0.1159 | 0.1172 | 101.12 | 99.41 |
| 16 | 0.1157 | 0.1171 | 101.21 | 99.32 |
| 17 | 0.1157 | 0.1172 | 101.30 | 99.41 |
| 18 | 0.1156 | 0.1172 | 101.38 | 99.32 |
| 19 | 0.1156 | 0.1170 | 101.21 | 99.24 |
| 20 | 0.1155 | 0.1172 | 101.47 | 99.41 |
| (h) pH of electrolyte = 4.7 | | | | |
| 1 | 0.1076 | 0.1081 | 100.46 | |
| 2 | 0.1072 | 0.1084 | 101.12 | 100.00 |
| 3 | 0.1066 | 0.1080 | 101.31 | 99.63 |
| 4 | 0.1067 | 0.1080 | 101.22 | 99.63 |
| 5 | 0.1068 | 0.1079 | 101.03 | 99.54 |
| 6 | 0.1064 | 0.1079 | 101.41 | 99.54 |
| 7 | 0.1064 | 0.1079 | 101.41 | 99.54 |
| 8 | 0.1065 | 0.1078 | 101.22 | 99.45 |
| 9 | 0.1065 | 0.1079 | 101.31 | 99.54 |
| 10 | 0.1062 | 0.1076 | 101.32 | 99.26 |
| 11 | 0.1061 | 0.1076 | 101.41 | 99.26 |
| 12 | 0.1061 | 0.1075 | 101.32 | 99.17 |
| 13 | 0.1061 | 0.1075 | 101.32 | 99.17 |
| 14 | 0.1058 | 0.1073 | 101.42 | 98.99 |
| 15 | 0.1059 | 0.1072 | 101.23 | 98.89 |
| 16 | 0.1058 | 0.1073 | 101.42 | 98.99 |
| 17 | 0.1059 | 0.1072 | 101.23 | 98.89 |
| 18 | 0.1060 | 0.1068 | 100.75 | 98.52 |
| 19 | 0.1059 | 0.1072 | 101.23 | 98.89 |
| 20 | 0.1061 | 0.1069 | 100.75 | 98.62 |
| (i) pH of electrolyte = 5.0 | | | | |
| 1 | 0.09197 | 0.09027 | 98.15 | |
| 2 | 0.09143 | 0.09070 | 99.20 | 100.00 |
| 3 | 0.09016 | 0.09065 | 100.54 | 99.94 |
| 4 | 0.08975 | 0.09053 | 101.08 | 99.78 |
| 5 | 0.08956 | 0.09036 | 100.89 | 99.63 |
| 6 | 0.08936 | 0.09027 | 101.02 | 99.53 |
| 7 | 0.08916 | 0.08983 | 100.75 | 99.04 |
| 8 | 0.08946 | 0.09079 | 101.49 | 100.10 |
| 9 | 0.08970 | 0.09060 | 101.00 | 99.89 |
| 10 | 0.08950 | 0.09042 | 101.03 | 99.69 |
| 11 | 0.08934 | 0.09031 | 101.09 | 99.57 |
| 12 | 0.08928 | 0.09016 | 100.99 | 99.40 |
| 13 | 0.08919 | 0.09003 | 101.17 | 99.48 |
| 14 | 0.08911 | 0.09015 | 101.17 | 99.39 |
| 15 | 0.08904 | 0.09010 | 101.19 | 99.34 |
| 16 | 0.08897 | 0.09005 | 101.21 | 99.28 |
| 17 | 0.08890 | 0.08990 | 100.00 | 99.12 |
| 18 | 0.08885 | 0.08900 | 100.19 | 98.13 |
| 19 | 0.08862 | 0.08969 | 101.21 | 98.89 |
| 20 | 0.08859 | 0.08957 | 101.11 | 98.75 |
| (j) pH of electrolyte = 10.0 | | | | |
| 1 | 0.02251 | 0.02161 | 98.00 | |
| 2 | 0.01931 | 0.01999 | 103.52 | 100.00 |
| 3 | 0.01743 | 0.01756 | 100.75 | 87.86 |
| 4 | 0.01024 | 0.01658 | 102.09 | 82.94 |
| 5 | 0.01536 | 0.01598 | 104.04 | 79.94 |
| 6 | 0.01473 | 0.01540 | 104.55 | 77.04 |
| 7 | 0.01469 | 0.01489 | 101.36 | 74.49 |
| 8 | 0.01467 | 0.01455 | 99.18 | 72.79 |
| 9 | 0.01333 | 0.01415 | 106.15 | 70.79 |

| Cycle Number | $Q_{in}$ (Coulombs) | $Q_{out}$ (Coulombs) | Coulombic Efficiency % ($Q_{out}/Q_{in}$) | Capacity % ($Q_{Nout}/Q_{2out}$) |
|---|---|---|---|---|
| 10 | 0.01298 | 0.01383 | 106.55 | 69.18 |
| 11 | 0.01267 | 0.01356 | 107.02 | 67.83 |
| 12 | 0.01239 | 0.01331 | 107.43 | 66.58 |
| 13 | 0.01215 | 0.01311 | 107.90 | 65.58 |
| 14 | 0.01192 | 0.01290 | 108.22 | 64.53 |
| 15 | 0.01174 | 0.01271 | 108.26 | 63.58 |
| 16 | 0.01153 | 0.01255 | 108.85 | 62.78 |
| 17 | 0.01135 | 0.01239 | 109.16 | 61.98 |
| 18 | 0.01117 | 0.01224 | 109.58 | 61.23 |
| 19 | 0.01103 | 0.01210 | 109.70 | 60.53 |
| 20 | 0.01086 | 0.01190 | 109.58 | 59.53 |

These cyclic voltammetry studies show conclusively that when a 1M $ZnCl_2$+0.5M $NH_4Cl$+(X)M HCl electrolyte is used, that good coulombic efficiencies together with good retention of capacity is only achieved at pH values between 1 and 10. The preferred electrolyte pH range is between about 2 and 5. The cyclic voltammetry studies are ideal for determining the stability of polyaniline cathode material since during the very short charge/discharge cycles (total of 4 minutes per cycle) the HCl liberated in the charge process by the reactions:

At lower pH values:

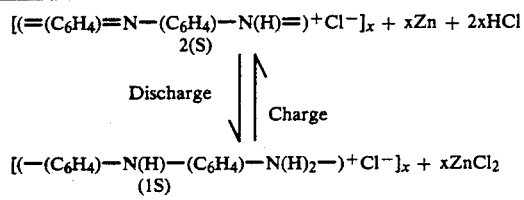

At higher pH values:

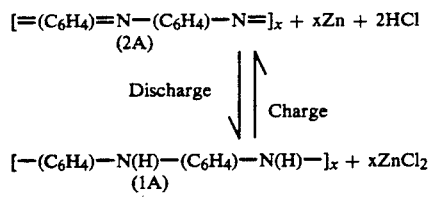

will not be able to diffuse so readily from the interior of polyaniline films as during the long charge/discharge cycles (total of approximately 12 and 6 hours per cycle) such as those described in Examples 20 and 21 respectively. The concentration of HCl in the interior of the films during the cyclic voltammetry studies could well be considerably greater than 1N. Since it is well known that the hydrolysis of imines is catalyzed by aqueous acid,

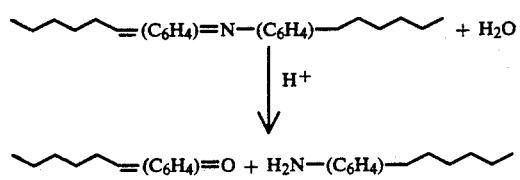

The increased acid concentration will promote irreversible destruction of the polyaniline cathode material. Therefore cyclic voltammetry gives a convenient method for calibrating the destructive process, if it should occur, of a polyaniline electrode. This serves as a useful method for evaluating the long-term cyclability of such an electrode.

EXAMPLE 27

The Effect of Gaseous $O_2$ on an Electrochemically Grown Film of Polyaniline (2A) on a Pt Foil Electrode: Electrocatalysis Polyaniline (2S) film (3.4 mg; 1 cm$^2$) was grown on Pt foil using the electrochemical method described in Example 1. The cell was constructed as described in Example 11 using a 1M $ZnCl_2$+0.5M $NH_4Cl$+0.1M $NaBF_4$ electrolyte. In this electrolyte of pH ca. 4–5, polyaniline (2S) spontaneously converts to polyaniline (2A). The cell was first discharged overnight at 0.7 V. Then $O_2$ was bubbled through the electrolyte with the application of a constant current density of 0.1 mA/cm$^2$ so that the polyaniline (1A) was being constantly oxidized electrochemically to form 2A. When the voltage reached 1.4 V the system was automatically switched to discharge. During nearly all of the experiment the cell voltage was above 0.90 V. After 20 hours the voltage dropped down to 0.87 V but it was found that the $O_2$ bubbling rate was lower than the original rate. Increasing the bubbling rate was found to increase the voltage to above 0.9 V. The total charge output during this 20-hour period was 6.53 times the charge needed to convert the polyaniline (1A) from a potential of 0.7 V to polyaniline (2A) at 1.40 V.

EXAMPLE 28

Electrocatalysis

The apparatus and electrolytes were identical to those used in Example 27. The battery was discharged at 0.7 V overnight under bubbling argon. The open circuit voltages ($V_{oc}$) vs. time were recorded. The results were as follows:

| Time (min) | $V_{oc}$ vs. Zn | Atmosphere |
|---|---|---|
| 0 | 0.711 | Ar |
| 5 | 0.711 | Ar |
| 10 | 0.712 | Ar |
| 20 | 0.715 | Ar |
| 30 | 0.717 | Ar |
| 31 | 0.918 | $O_2$ |
| 32 | 0.935 | $O_2$ |
| 33 | 0.943 | $O_2$ |
| 34 | 0.954 | $O_2$ |
| 35 | 0.961 | $O_2$ |
| 36 | 0.967 | $O_2$ |
| 37 | 0.972 | $O_2$ |
| 38 | 0.976 | $O_2$ |
| 39 | 0.978 | $O_2$ |
| 40 | 0.981 | $O_2$ |
| 45 | 0.992 | $O_2$ |
| 50 | 1.000 | $O_2$ |
| 55 | 1.004 | $O_2$ |
| 60 | 1.008 | $O_2$ |
| 70 | 1.014 | $O_2$ |
| 80 | 1.020 | $O_2$ |
| 90 | 1.026 | $O_2$ |
| 120 | 1.037 | $O_2$ |
| 150 | 1.048 | $O_2$ |
| 180 | 1.056 | $O_2$ |

It was found that the $V_{oc}$ increased very slowly under bubbling Ar but that the $V_{oc}$ immediately increased very rapidly from 0.717 V to 0.918 V within 1 minute when $O_2$ was bubbled through the electrolyte. The $V_{oc}$ continued to rise as $O_2$ was bubbled through the electrolyte.

EXAMPLE 29

Effect of Oxygen on Battery Background Current

Two batteries were constructed as described in Example 11. The two batteries differed only in the atmospheres in which they were constructed and cycled. One battery was in an atmosphere of air while the other battery was under an argon atmosphere. Before building the second battery, argon was bubbled through the electrolyte solution for one hour, then the battery was built and sealed in a glove bag under argon.

The two batteries were charged under a constant current density of 0.1 mA/cm$^2$ to 1.40 V, then were immediately discharged at a constant current density of 0.1 mA/cm$^2$ to 0.70 V. The batteries were then discharged at a constant potential of 0.70 V overnight (about 18 hours). It was found that the background currents of the two batteries were quite different. The battery which was in air had a background current of 6 microamperes while the battery which was under an argon atmosphere had a background current of 0.1 microamperes.

It may be concluded from Examples 27, 28 and 29 that the polyaniline and/or the Pt electrode was serving as an electrocatalytic electrode for the reduction of gaseous O$_2$. Studies of the activity of polyaniline apart from platinum have verified the catalytic activity of the polymer.

EXAMPLE 30

The Effect of Gaseous O$_2$ on a Polyaniline Film in the Absence of Pt

An electrochemically grown free standing film (about 0.3 cm$^2$) synthesized as described in Example 3 was sandwiched between two sections of a Pt grid. It was discharged in a cell identical to that in Example 11 under bubbling N$_2$. The discharged film was yellow-green color. The film was separated from the Pt grid in a glove bag filled with Ar. The film was then replaced in the solution and O$_2$ was bubbled into the solution for 1 hour. The color of the film changed from a yellowish green color to a dark green color. After bubbling Ar for 20 minutes the film was again pressed onto the Pt grid. The V$_{oc}$ was measured between the film and the Zn electrode. It was found to be 1.058 V, characteristic of polyaniline (2A). When this cell was discharged at 0.7 V, the initial current was relatively high (greater than 5 mA).

EXAMPLE 31

Polyaniline Film as an Electrocatalytic Fuel Cell Type Electrode for the Reduction of O$_2$ From the preceeding examples, it is apparent that polyaniline (1A) can be oxidized by O$_2$ in the absence of Pt. This provides the possibility of using this material as an oxygen fuel cell type electrode. This involves the continuous chemical oxidation of polyaniline (1A or 1S) by oxygen:

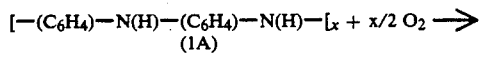
(1A)

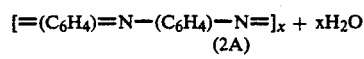
(2A)

or

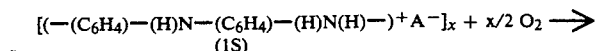
(1S)

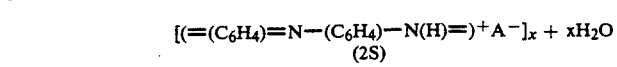
(2S)

and the simultaneous continuous electrochemical reduction of the polyaniline (2A) or polyaniline (2S) so formed by an electropositive metal such as Zn, Al, Cd, Fe, Pb, etc. When the polyaniline electrode, over which the O$_2$ is bubbling is connected by an external wire to the metal anode both electrodes being immersed in an aqueous electrolyte of the metal salt, the electrode reactions are:

CATHODE

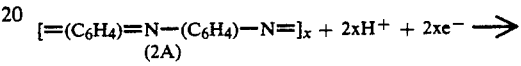
(2A)

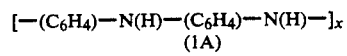
(1A)

or

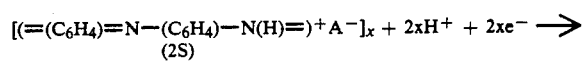
(2S)

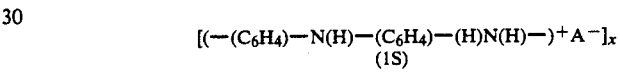
(1S)

ANODE

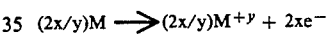

The net overall reaction at steady state consumes only O$_2$ and the metal. The polyaniline therefore acts as a electrocatalytic electrode, e.g. when using Zn in neutral solution:

If the cell is operated in acid solution, e.g. with a lead anode, acid will also be consumed during operation.

The electrocatalytic effect was demonstrated using free standing polyaniline (2S) film (area ca. 0.2 cm$^2$), prepared as described in Example 3. The film was glued to a Pt clip using Electrodag ™ and the clip was covered with "Microstop" ™ and was immersed in an electrolyte solution of 7.4M HBF$_4$. It was connected via an ammeter to a Pb anode.

As shown in FIG. 7, when the film was discharged for one hour the current dropped from the initial 4.4 mA to 0.0014 mA. Then O$_2$ was bubbled through the system. The current went up to 0.0306 mA. When N$_2$ was bubbled through the system for one hour, the current dropped to 0.0038 mA. Bubbling O$_2$ through the system again restored the current. With O$_2$ bubbling, the fuel cell was operated for 10 hours with only a slight decrease in current (0.0295 to 0.0245 mA). When the film was cut off, bubbling O$_2$ over the clip gave a current of only 0.0019 mA. This indicates the current observed is not due to the current collector. This example demonstrates that polyaniline (2S) film can act as an electrocatalytic electrode for the reduction of gaseous O$_2$.

EXAMPLE 32

Characteristics of a Cell Containing Polyaniline (2S) as an Anode Material

This study was carried out in an identical manner to that of Example 16 except that 20 mg polyaniline (2S) synthesized as described in Example 6 was used in 6M $H_2SO_4$ in conjunction with a $PbO_2$ electrode (Exide Corp.). The two electrodes were 1.5 cm apart. This cell exhibited an open circuit voltage of 1.10 V and a short circuit current of 80 mA.

EXAMPLE 33

Recycling Battery Studies Using Chemically Made Polyaniline (2S) as an Anode in a Flashlight Battery Configuration Six hundred mg of polyaniline (2S) $[=(C_6H_4)=N-(C_6H_4)-N(H)=)^+BF_4^-]_x$, synthesized as described in Example 6, mixed with 5% by weight of carbon black was formed into a paste with 1 cc of 6M $H_2SO_4$. A $PbO_2$ (Exide Corp.) was employed. The cell was constructed in a small glass vial using glass filter paper to separate the polyaniline (2S) paste from the $PbO_2$ electrode. A carbon rod was inserted as a current collector into the polyaniline (2S) paste so that 1.5 cm² of carbon was covered by the paste. The top of the cell was sealed with molten paraffin wax. The cell exhibited an open cell voltage of 1.1 V and short circuit current of ca. 460 mA. The cell was discharged at a constant current of 10 mA from 1.1 V to 0.9 V and was then cycled 4 times at a constant current of 10 mA between 1.40 V and 0.9 V exhibiting coulombic efficiencies of about 80%. After four cycles, the capacity was 80% that of the initial cycle. This is consistent with the results of Example 32. The charge and discharge reactions are:

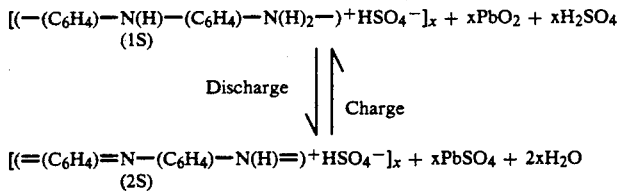

$[(-(C_6H_4)-N(H)-(C_6H_4)-N(H)_2-)^+HSO_4^-]_x + xPbO_2 + xH_2SO_4$
(1S)

Discharge ⇅ Charge $[(=(C_6H_4)=N-(C_6H_4)-N(H)=)^+HSO_4^-]_x + xPbSO_4 + 2xH_2O$
(2S)

EXAMPLE 34

The Effect of Gaseous Oxygen on Polyaniline (2S) in the Absence of Pt

Figures 8, 8A:
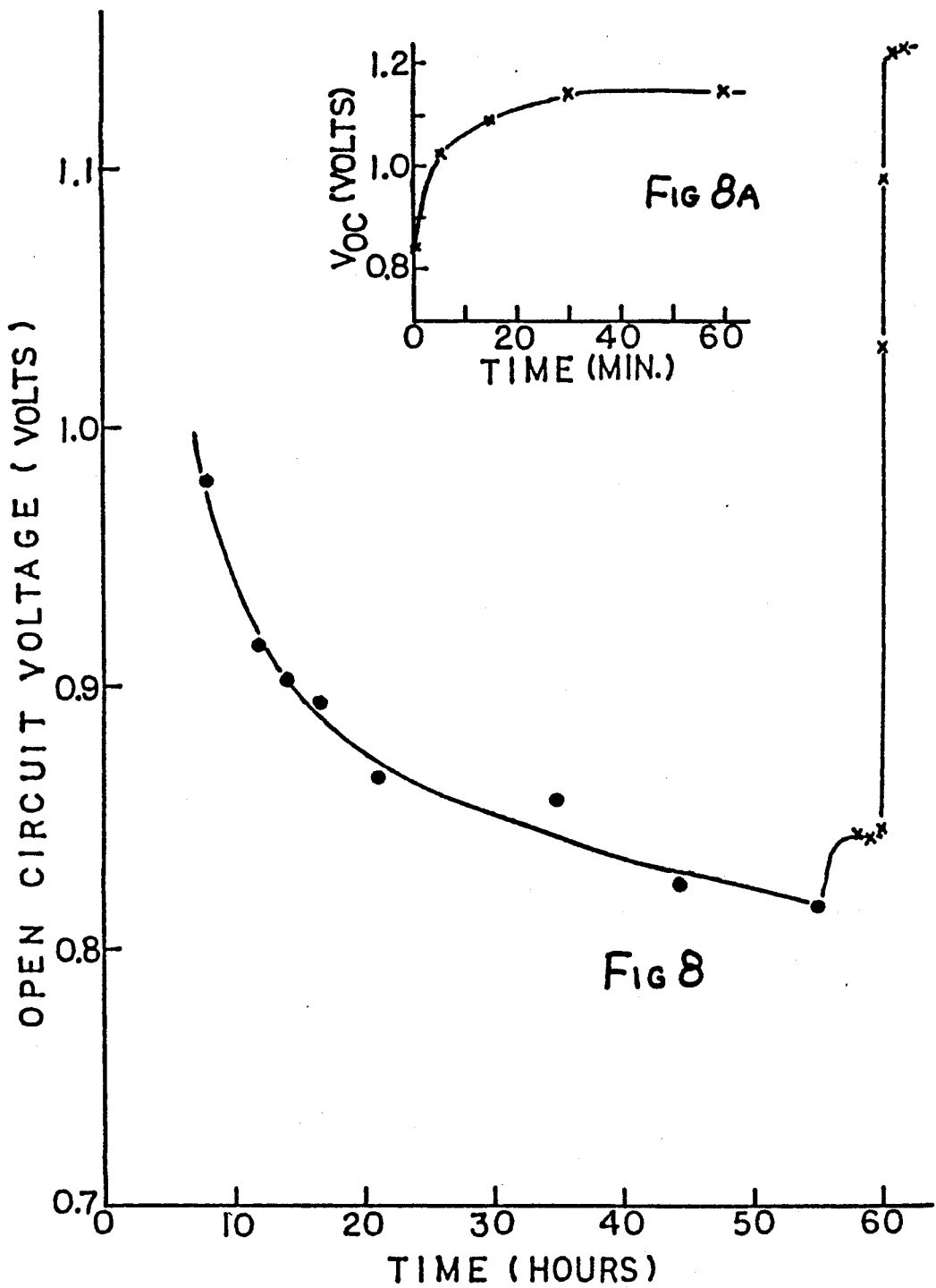

Polyaniline (Cl⁻ Anion) (2S) powder (4.5 mg) synthesized as described in Example 7 was suspended in ca. 4 cc of (1.0M $ZnCl_2$ plus 0.5M $NH_4Cl$) electrolyte solution in contact with a 1 cm² Pt foil electrode placed at the bottom of the cell. A 1 cm² zinc electrode was suspended in the top portion of the electrolyte. The cell was in an argon atmosphere. The open circuit voltage at the beginning of the experiment, $V_{oc}=1.3$ V (vs. Zn). The cell was discharged at a constant current of 0.1 mA until the potential of the cell decreased to 0.7 V. A constant voltage of 0.7 V was then applied for 8 hours. The cell was disconnected from the power source and the powder was stirred with a magnetic stirring bar for 5 seconds. The powder was allowed to settle for 5 minutes and then the $V_{oc}$ was recorded. The procedure of applying a constant voltage of 0.7 V for a given duration followed by disconnecting the cell, then 5 seconds stirring, then 5 minutes settling and finally measuring the $V_{oc}$, was repeated several times over a period of 55 hours. The resulting open circuit voltages after the corresponding durations of the applied voltage are shown in FIG. 8. After the last measurement the powder was again stirred for 5 seconds and was then allowed to settle for 3 hours in the absence of an applied potential. The $V_{oc}$ was then measured and was found to increase. The powder was again stirred for 5 seconds and was allowed to settle for 1 hour. This was repeated twice and the $V_{oc}$ was measured after each operation. The $V_{oc}$ increased only slightly during the last two hours in the absence of an applied potential.

At this time (60 hrs after the beginning of the experiment), the Pt electrode was removed from the cell. Oxygen was bubbled into the solution/powder mixture for 5 minutes, followed by bubbling of argon for 10 minutes. The Pt electrode was then replaced in the cell and the $V_{oc}$ was measured. The Pt electrode was removed immediately after measuring the $V_{oc}$ and oxygen was bubbled through the mixture for the durations of time shown in FIG. 8A (the starting point of 8A corresponds to 60 hrs of the lower part of the Figure). Each $V_{oc}$ was measured after bubbling oxygen, then bubbling argon for 10 minutes. The $V_{oc}$ increased rapidly upon exposure to oxygen.

It is concluded that polyaniline can be oxidized by gaseous oxygen in the absence of Pt.

EXAMPLE 35

Polyaniline Film as an Electrocatalytic Fuel Cell Type Electrode for the Oxidation of Hydrazine and Sodium Dithionite A dark green electrochemically grown film of polyaniline (2S) prepared according to Example 1 was exposed to the vapor of hydrazine for ca. 5 seconds. It was immediately reduced to the 1A form in the presence of the alkaline hydrazine vapor as deduced from the fact that it became almost colorless. The 1A form of polyaniline is initially colorless when present as thin films. On exposure to air it becomes oxidized to the characteristic blue color of form 2A when present as thin films. On exposure to hydrazine vapor it again became colorless.

A similar sample of polyaniline (2S) was immersed in a ca. 1 molar aqueous solution of sodium dithionite. It was instantly reduced to the colorless 1A form. It was then placed in a 1 molar $ZnCl_2+0.5$ molar $NH_4Cl$ electrolyte and was found to have an open circuit voltage, $V_{oc}$, (vs. Zn) of 0.76 V, characteristic of reduced polyaniline (1A or 1S).

From the above results and from the results of Example 34 it is apparent that polyaniline can be used as an electrocatalytic electrode both for the reduction of an oxidizing agent such as $O_2$ and for the oxidation of a reducing agent such as hydrazine. This permits the use of polyaniline in a fuel cell configuration with the concomitant generation of an electric current involving an overall reaction such as $$N_2H_4 + O_2 \rightarrow N_2 + 2H_2O$$

A "fuel cell" configuration for this reaction would consist of two polyaniline electrodes immersed in an appropriate electrolyte ionizable to give H+ ions. If $O_2$ is constantly bubbled over one electrode (i.e. the cathode, where $O_2$ is being reduced) the polyaniline will be held in the 2A form, any 1A form being oxidized according to the equation:

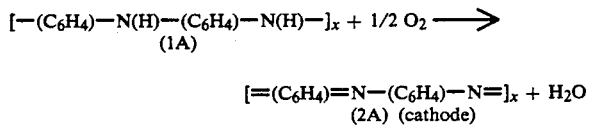

If $N_2H_4$ is constantly bubbled over the other electrode (i.e. the anode, where $N_2H_4$ is being oxidized) the polyaniline will be held in the 1A form, any 2A form being reduced according to the equation:

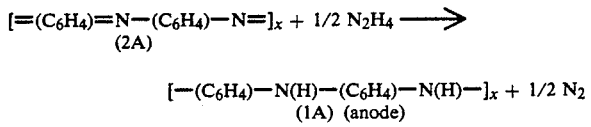

Hence, if the anode and cathode are connected by an external wire, electrons will constantly flow from the anode through the external wire to the cathode, i.e. from the reduced form of polyaniline (1A) to the oxidized form of polyaniline (2A), so as to try to impart the same oxidation state to each polyaniline electrode, viz.,

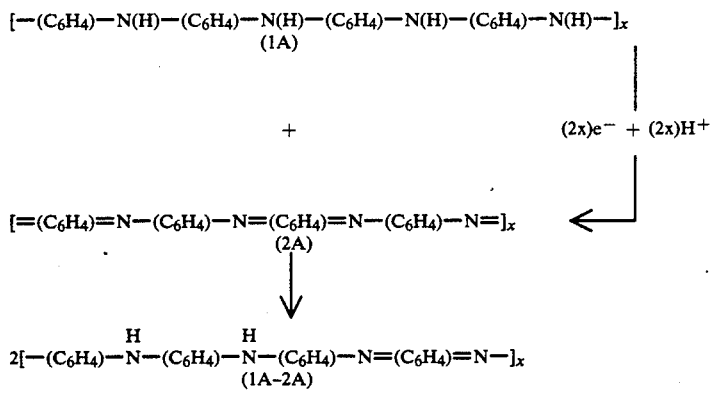

An electric current will flow in the external wire so long as the passage of the $O_2$ and $N_2H_4$ is continued.

Analagous reactions involving the "S" forms of polyaniline would occur when electrolytes having a sufficiently small pH to protonate the nitrogen atoms were used.

Other oxidizing agents besides $O_2$ and other reducing agents besides $N_2H_4$ may be used.

It is claimed:

1. A secondary battery comprising an anode means, a cathode means and an electrolyte, the anode means being stable in the electrolyte, the cathode means comprising an aniline polymer, the electrolyte being maintained at a pH between 2 and 11.

2. The battery of claim 1 wherein the aniline polymer comprises polyaniline.

3. The battery of claim 2 wherein the polymer comprises polyaniline 2A or a mixture of polyaniline 1A and polyaniline 2A.

4. The battery of claim 1 wherein said pH is maintained between 3.2 and 5.

5. The battery of claim 1 wherein the polymer comprises substituted polyaniline.

6. The battery of claim 1 wherein the anode comprises a material having a reduction potential of less than about +0.64 volts.

7. The battery of claim 6 wherein the anode comprises a metal.

8. The battery of claim 1 further comprising buffer means to maintain said pH.

9. The battery of claim 1 substantially recyclable in excess of about 100 times.

10. The battery of claim 1 wherein the anode comprises an aniline polymer.

11. The battery of claim 10 wherein the anode and cathode form portions of a unitary mass of material.

12. The battery of claim 11 wherein the unitary mass is impregnated with the electrolyte.

13. The battery of claim 1 further comprising conductivity enhancing material.

14. The battery of claim 13 wherein the enhancing material comprises carbon.

15. The battery of claim 1 wherein the cathode comprises the aniline polymer on a current collector.

16. The battery of claim 15 wherein the polymer is in the form of a film.

17. The battery of claim 1 wherein the aniline polymer cycles between forms 1A and 2A upon cycling of the battery.

18. The battery of claim 1 wherein aniline polymer cycles among one or more of the forms of polyaniline depicted in FIG. 1 or mixtures thereof.

19. The battery of claim 1 wherein the polyaniline cycles among the five forms of polyaniline as depicted in FIG. 1.

20. A secondary battery comprising an anode means, a cathode means and an aqueous electrolyte, the anode means comprising an aniline polymer, the cathode means comprising a material having a positive reduction potential and being stable in the electrolyte, the electrolyte being maintained at a pH between 2 and 6.

21. The battery of claim 20 wherein the aniline polymer comprises polyaniline.

22. The battery of claim 20 wherein said pH is maintained between 3.2 and 5.

23. The battery of claim 20 wherein the polymer comprises substituted polyaniline.

24. The battery of claim 20 wherein the cathode comprises an organic composition.

25. The battery of claim 20 wherein the cathode comprises an oxide of a metal.

26. The battery of claim 20 wherein the cathode comprises a p-doped polymer.

27. The battery of claim 20 further comprising buffer means to maintain the pH.

28. A fuel cell comprising anode means, cathode means and electrolyte, at least one of the electrodes comprising an aniline polymer, said electrolyte being maintained at a pH between about 2 and 11.

29. The cell of claim 28 maintained at a pH between 3.2 and 5.

30. The cell of claim 28 wherein each of the electrodes comprise aniline polymer.

31. The cell of claim 30 wherein the electrodes comprise portions of a unitary mass of polymer.

32. The cell of claim 31 wherein the unitary mass is impregnated by the electrolyte.

33. The cell of claim 28 wherein the polymer comprises polyaniline.

34. The cell of claim 28 wherein the aniline polymer is in form 1A or 2A or mixtures thereof.

35. The cell of claim 28 further comprising buffer means to maintain said pH.

36. The cell of claim 28 further comprising conductivity enhancing material.

* * * * *